(12) United States Patent
Kaneko et al.

(10) Patent No.: US 8,094,372 B2
(45) Date of Patent: Jan. 10, 2012

(54) TELESCOPE AND BINOCULAR BODY MEMBER

(75) Inventors: Masanobu Kaneko, Yokohama (JP); Satoshi Arai, Kawasaki (JP); Masashi Tanaka, Kawasaki (JP); Hidenori Terasawa, Kashiwa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/844,030

(22) Filed: Jul. 27, 2010

(65) Prior Publication Data

US 2010/0290112 A1 Nov. 18, 2010

Related U.S. Application Data

(63) Continuation of application No. PCT/JP2009/052252, filed on Feb. 4, 2009.

(30) Foreign Application Priority Data

| Feb. 5, 2008 | (JP) | ................................. | 2008-025672 |
| Apr. 7, 2008 | (JP) | ................................. | 2008-099564 |
| Apr. 14, 2008 | (JP) | ................................. | 2008-105004 |
| Jul. 28, 2008 | (JP) | ................................. | 2008-192939 |

(51) Int. Cl.
    *G02B 23/00* (2006.01)
(52) U.S. Cl. ........................................ 359/407
(58) Field of Classification Search ........... 359/407–418
    See application file for complete search history.

(56) References Cited

U.S. PATENT DOCUMENTS

| 4,383,741 | A | | 5/1983 | Vogl et al. | |
| 4,626,081 | A | | 12/1986 | Nishizawa | |
| 5,444,568 | A | * | 8/1995 | Williams et al. | ............... 359/400 |
| 5,561,557 | A | * | 10/1996 | Le Bris et al. | ................ 359/409 |
| 2007/0229973 | A1 | | 10/2007 | Souma | |

FOREIGN PATENT DOCUMENTS

| JP | 49-39442 U | 4/1974 |
| JP | 56-125718 A | 10/1981 |
| JP | 06-14131 B2 | 2/1994 |
| JP | 06-250099 A | 9/1994 |
| JP | 06-308431 A | 11/1994 |
| JP | 07-230044 A | 8/1995 |
| JP | 09-015509 A | 1/1997 |
| JP | 2007-279147 A | 10/2007 |

OTHER PUBLICATIONS

English version of International Preliminary Report on Patentability from International Patent Appln. No. PCT/JP2009/052252.

* cited by examiner

*Primary Examiner* — Alessandro Amari

(74) *Attorney, Agent, or Firm* — Miles & Stockbridge P.C.

(57) ABSTRACT

A telescope 110 includes: a single objective optical system 113; and a binocular body member (111, 112); the binocular body member including a mount portion 116 for connecting to the objective optical system 113, and a controller 114 for controlling the objective optical system, thereby providing a telescope capable of making binocular observation of an image of an object formed by a single objective lens.

6 Claims, 21 Drawing Sheets

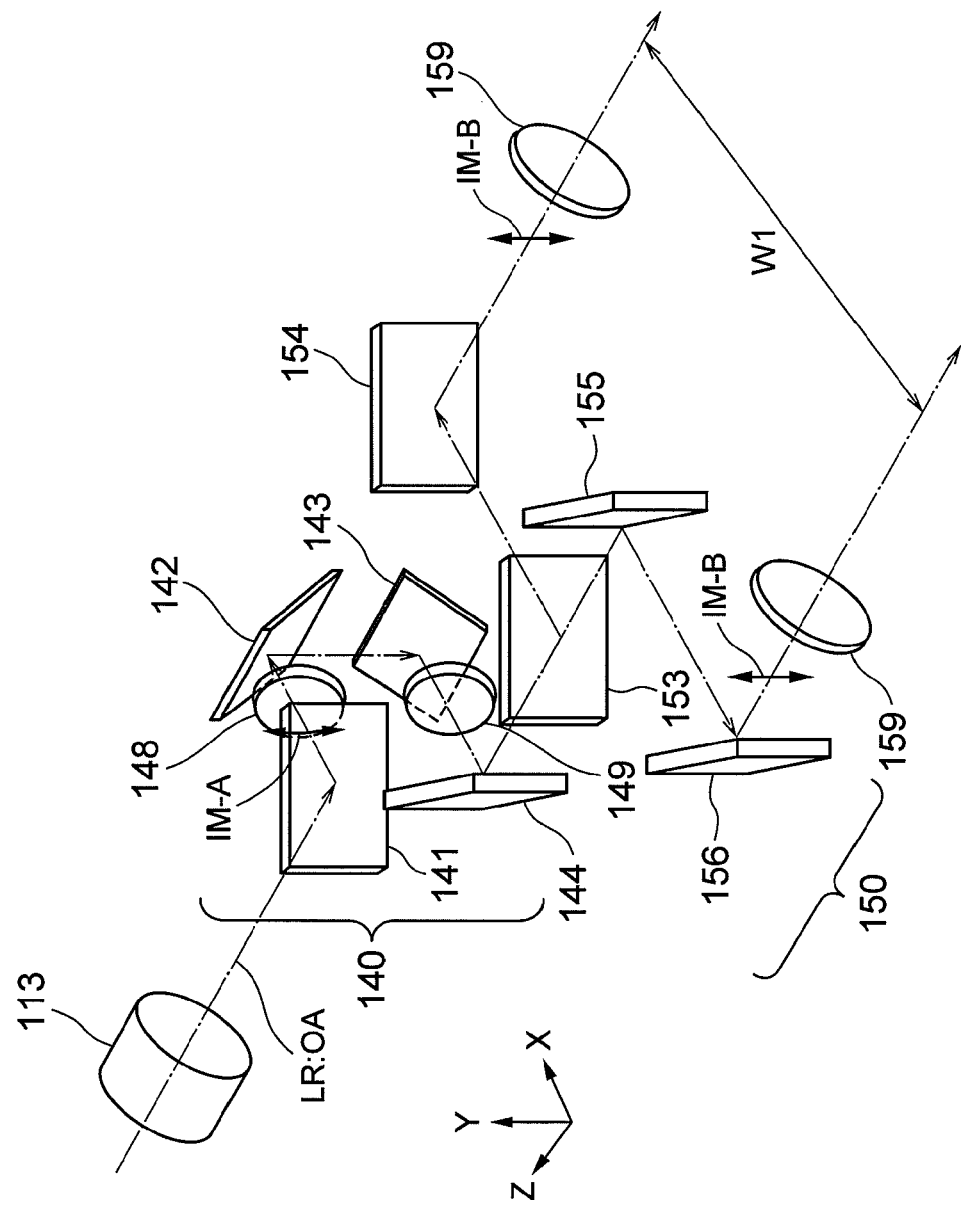

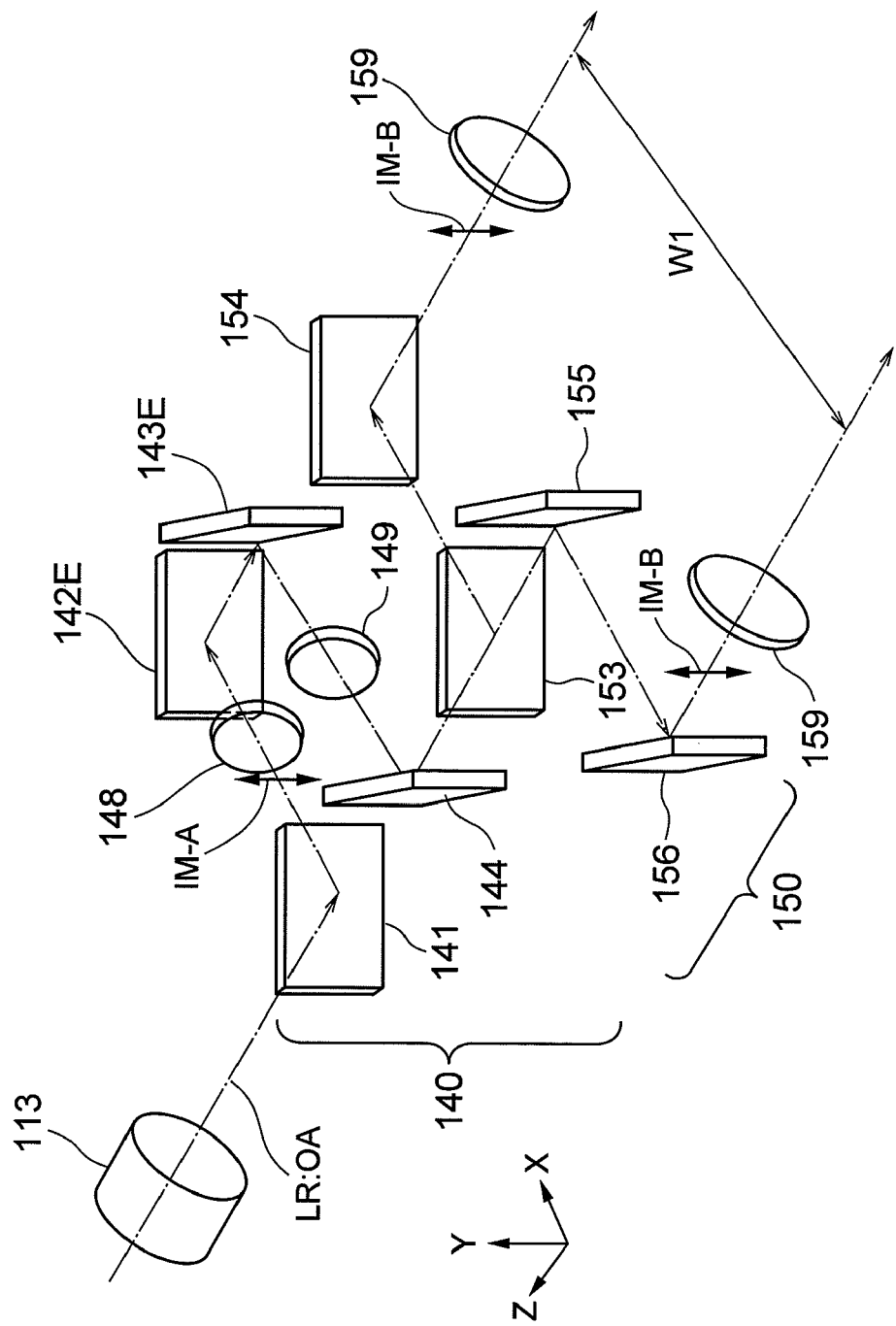

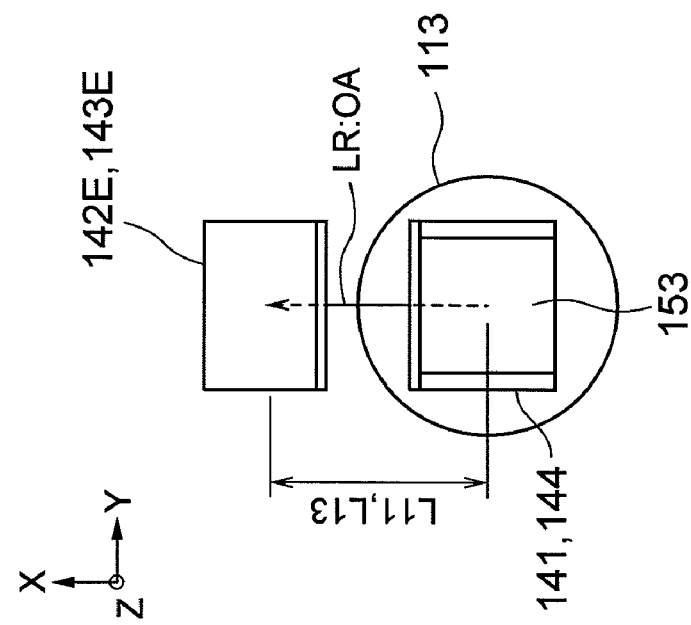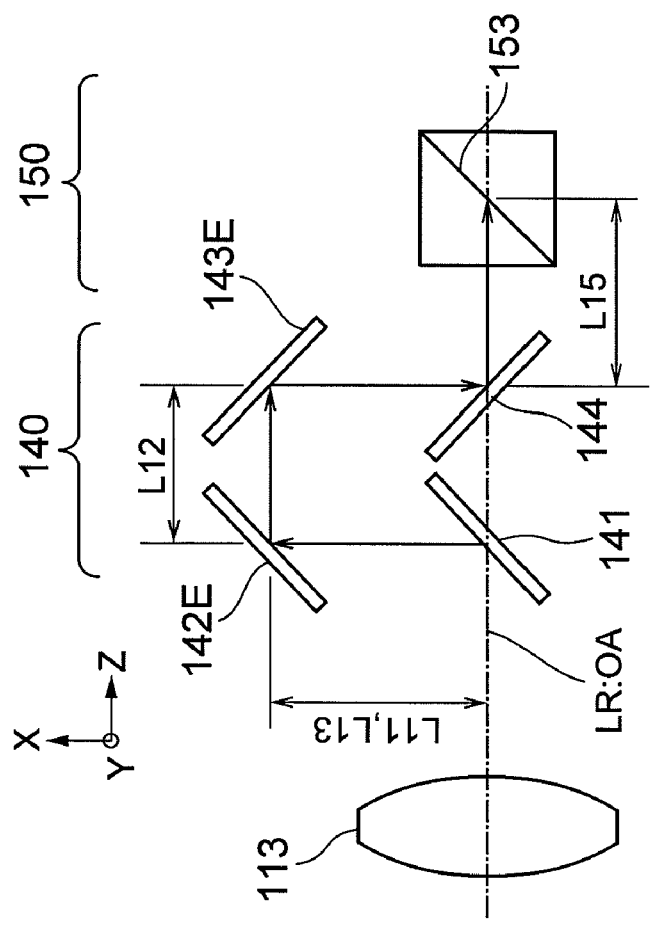
FIG.21A
FIG.21B

TELESCOPE AND BINOCULAR BODY MEMBER

CROSS-REFERENCE TO RELATED APPLICATION

This application is a continuation of International Application No. PCT/JP2009/052252 filed Feb. 4, 2009.

TECHNICAL FIELD

The present invention relates to a telescope and a binocular body member.

BACKGROUND ART

A telescope composed of an objective lens forming an image of an object disposed at infinity and an eyepiece for enlarging the image of the object formed by the objective lens has been generally known (for example, see Japanese Examined Patent Application Publication No. 6-14131).

However, a telescope capable of observing an image of an object formed by a single objective lens with two eyepiece optical systems, in other word, binocular observation has not been proposed. Accordingly, a telescope capable of performing binocular observation by introducing binocular optical system into a conventional telescope can be considered, though the focal length of the objective lens is necessary to be short in order to shorten the total length of the telescope. However, when the focal length of the objective lens is made short, a distance between the objective lens and an image formed by the objective lens becomes short, so that it becomes difficult to secure a space for introducing the binocular optical system.

DISCLOSURE OF THE INVENTION

The present invention is made in view of the aforementioned problem, and has an object to provide a user-friendly, compact telescope capable of making binocular observation of an image of an object formed by a single objective lens.

In order to solve the problem, a first aspect of the present invention provides a telescope comprising: a single objective optical system; and a binocular body member; the binocular body member including a mount portion for connecting to the objective optical system, and a controller for controlling the objective optical system.

According to a second aspect of the present invention, there is provided a binocular body member with a binocular optical system comprising: a mount portion for connecting to an objective optical system; and a controller for controlling the objective optical system.

The present invention makes it possible to provide a user-friendly, compact telescope capable of making binocular observation of an image of an object formed by a single objective lens, and a binocular body member.

BRIEF DESCRIPTION OF THE DRAWINGS

FIG. 17 is a perspective view showing an arrangement of mirrors in the body portion according to a tenth embodiment of the present invention.

FIGS. 18A and 18B are drawings showing an optical path equipped with a light introduction optical system according to a tenth embodiment, in which FIG. 18A is a plan view of an XZ plane, and FIG. 18B is a plan view of an XY plane.

FIGS. 18C and 18D are reference views showing an optical path between the interchangeable lens portion and a light flux division optical system in a case where the light introduction optical system is not exist, in which FIG. 18C is a plan view of an XZ plane, and FIG. 18D is a plan view of an XY plane.

FIG. 20 is a perspective view showing an arrangement of mirrors in a body portion according to a twelfth embodiment of the present invention.

FIGS. 21A and 21B show an optical path of a light introduction optical system according to the twelfth embodiment of the present invention, in which FIG. 21A is a plan view of an XZ plane, and FIG. 21B is a plan view of an XY plane.

EMBODIMENT FOR CARRYING OUT THE INVENTION

A telescope according to each embodiment of the present invention is explained below with reference to accompanying drawings.

First Embodiment

Figure 1:
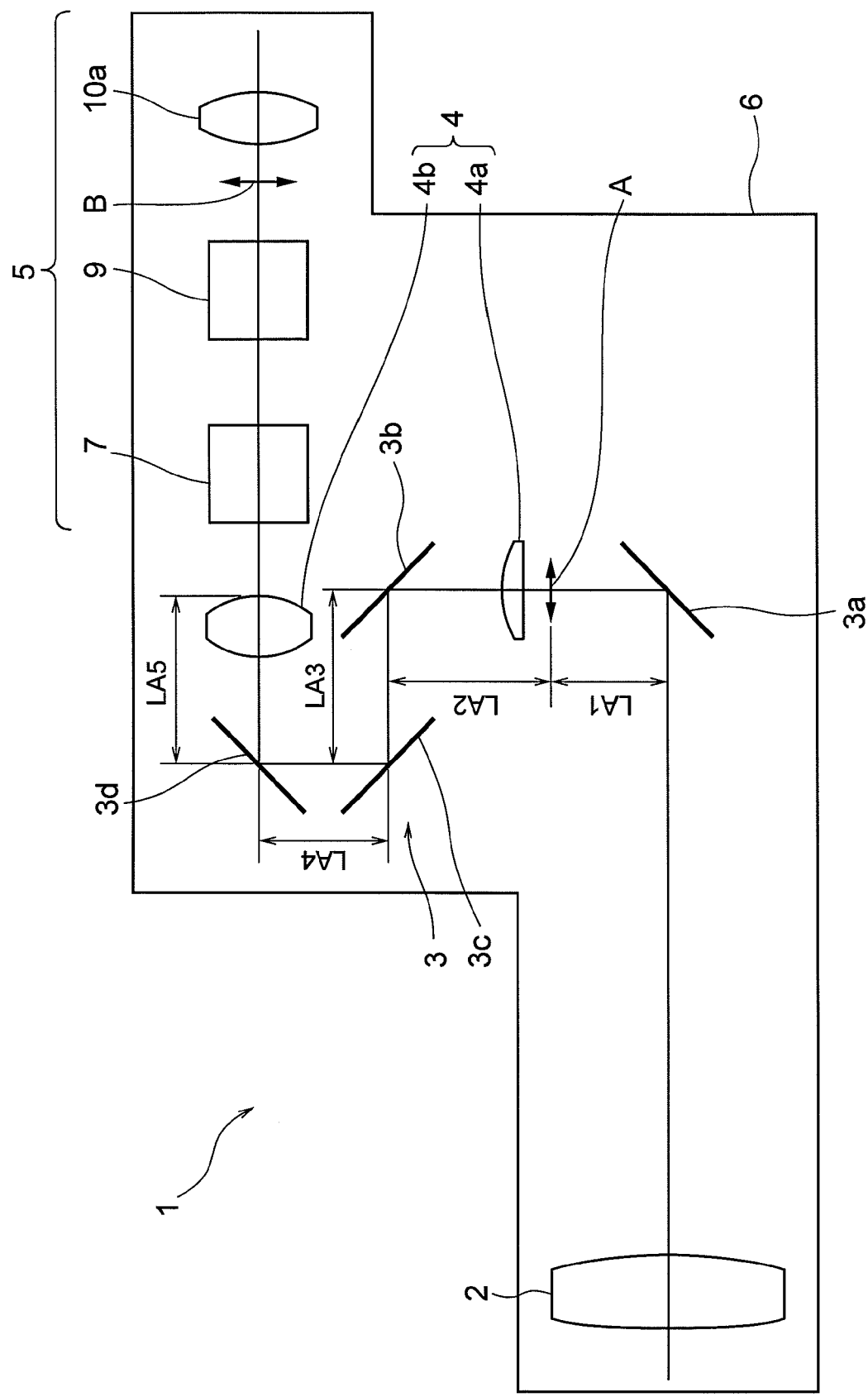
FIG. 1 is a side view showing a construction of a telescope according to a first embodiment of the present invention.
Figure 2:
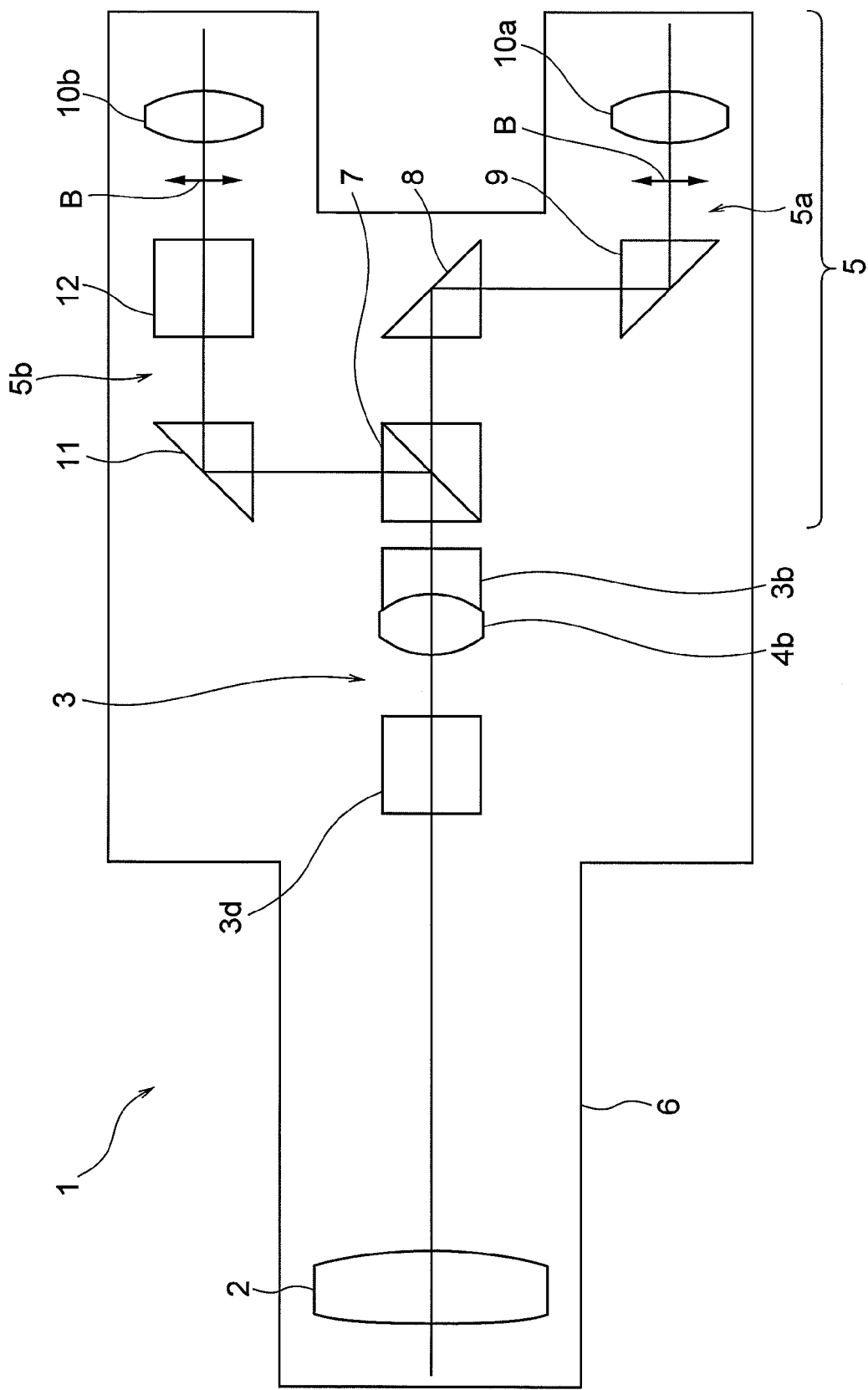
FIG. 2 is a top view showing a construction of a telescope according to the first embodiment of the present invention.

FIGS. 1 and 2 are a side view and a top view, respectively, of a telescope according to a first embodiment of the present invention.

The telescope 1 according to the first embodiment is equipped with an objective lens 2, an optical path deflection optical system 3, an erecting relay optical system 4, and a binocular optical system 5 in a housing 6.

The objective optical system 2 is a lens for forming a primary image (reversed image) A of an unillustrated object with converging light from the object, and disposed to the most object side.

As shown in FIG. 1, the optical path deflection optical system 3 is composed of a first mirror 3a that reflects light from the objective optical system 2 perpendicularly (upward in FIG. 1), a second mirror 3b that reflects light from the first mirror 3a perpendicularly toward the object side (left ward in FIG. 1), a third mirror 3c that reflects light from the second mirror 3b parallel to the reflection optical axis of the first mirror 3a (upward in FIG. 1), and a fourth mirror 3d that reflects light from the third mirror 3c in a direction parallel to the optical axis of the objective optical system 2 (right ward in FIG. 1).

The erecting relay optical system 4 is an optical system for forming a secondary image B (erecting image) by converging light which has formed the primary image A of the object, and is composed of a first erecting relay lens 4a disposed in the vicinity of the primary image A between the first mirror 3a and the second mirror 3b, and a second erecting relay lens 4b disposed right behind the fourth mirror 3d as an imaging lens.

Incidentally, the first erecting relay lens 4a is a field lens that forms an exit pupil of the objective optical system 2 in the vicinity of the second erecting relay lens 4b in order to effectively guide light flux from the objective optical system 2 to the second erecting relay lens 4b.

The binocular optical system 5 that has a prism arrangement optical system of a so-called Seidentopf type known well as a binocular eyepiece tube for a microscope, and is composed of an optical path division prism 7 that divides the optical path of the erecting relay optical system 4 (the optical path from the primary image A to the secondary image B of the object) into two, a left-eye optical system 5a that is disposed on the transmission optical path of the optical path division prism 7, and a right-eye optical system 5b that is disposed on the reflection optical path of the optical path division prism 7, as shown in FIG. 2.

The left-eye optical system 5a is composed of a triangular prism 8 that reflects light transmitted through the optical path division prism 7 perpendicularly, a triangular prism 9 that reflects light from the triangular prism 8 in a direction parallel to the optical axis of the objective optical system 2 (right ward in FIG. 2), and an eyepiece 10a.

The right-eye optical system 5b is composed of a triangular prism 11 that reflects light reflected by the optical path division prism 7 in a direction parallel to the optical axis of the objective optical system 2 (right ward in FIG. 2), a quadrilateral prism 12 that corrects an optical path length, and an eyepiece 10b. A virtual image of the secondary image B formed by the erecting relay optical system 4 is formed to be observed by a user.

Incidentally, the right-eye optical system 5b (including the optical path division prism 7) and the left-eye optical system 5a are rotatable around a mechanical axis set parallel to the optical axis of the objective optical system 2. Accordingly, with rotating the left-eye optical system 5a and the right-eye optical system 5b around the mechanical axis, the user of the telescope 1 according to the present embodiment makes it possible to adjust the distance thereof to an interpupillary distance of the user.

In the telescope 1 according to the present embodiment having the above-described construction, light from an unillustrated object is converged by the objective optical system 2 to form the primary image A. The light which has formed the primary image A is reflected by the first mirror 3a, and reflected by the second, the third, and the fourth mirrors 3b, 3c and 3d after passed through the first erecting relay lens 4a. Then, after passed through the second erecting relay lens 4b, the light is divided by the optical path division prism 7 and led into the left-eye optical system 5a and the right-eye optical system 5b, respectively. Light led into the left-eye optical system 5a is reflected by two triangular prisms 8 and 9, and forms a secondary image B. Light led into the right-eye optical system 5b is passed through the triangular prism 11 and the quadrilateral prism 12, and forms a secondary image B similar to the left-eye optical system 5a. Accordingly, with looking through the eyepiece 10a of the left-eye optical system 5a and the eyepiece 10b of the right-eye optical system 5b, the user of the telescope 1 makes it possible to observe an erected image of the object.

As described above, the telescope 1 according to the present embodiment secures a space for disposing the binocular optical system 5 in the optical path with relaying the primary image A formed by the objective optical system 2 by the erecting relay optical system 4.

Figure 6:
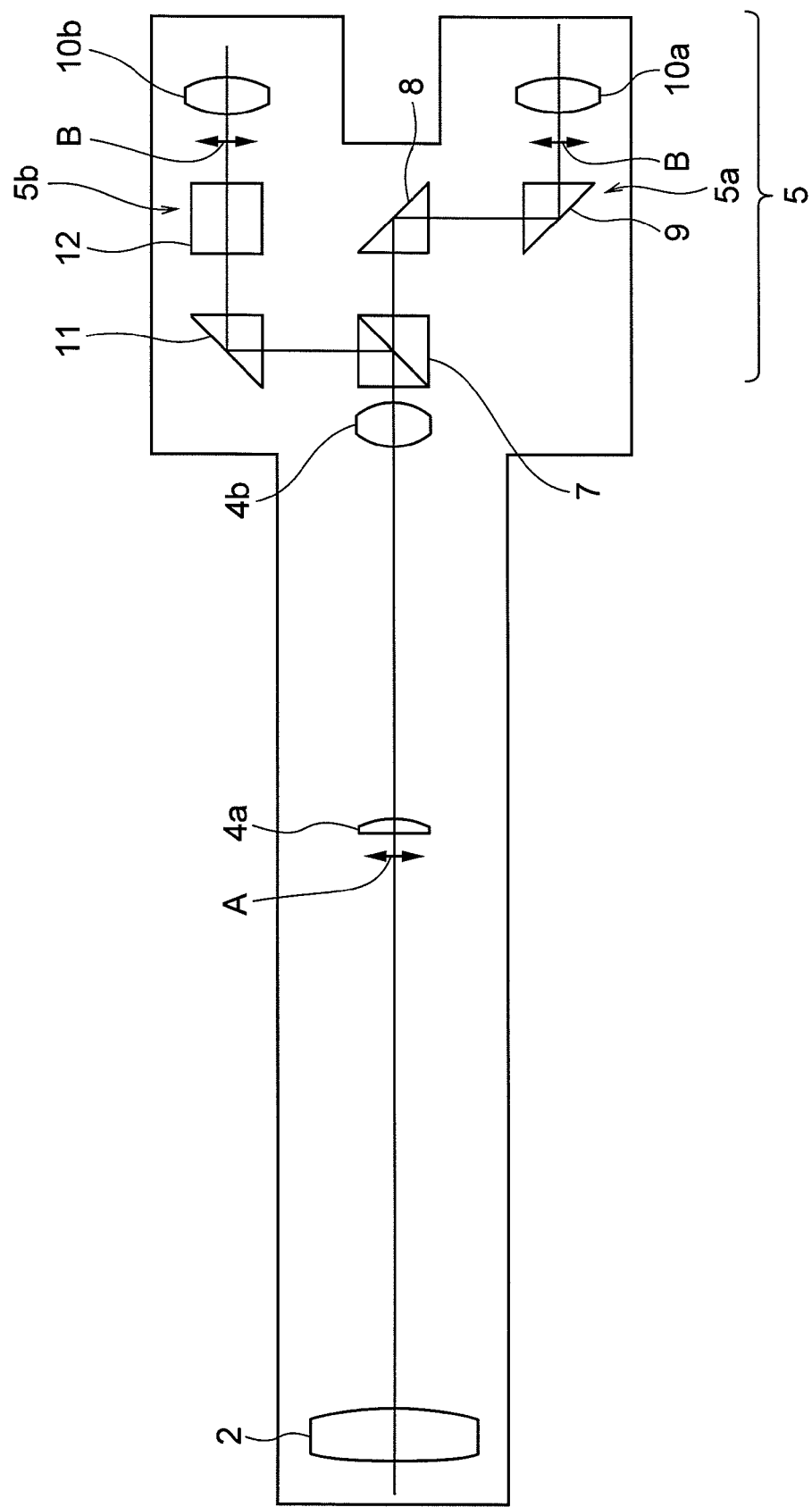
FIG. 6 is a reference drawing excluding an optical path deflection optical system from the telescope according to the first embodiment of the present invention.

When the optical path deflection optical system 3 is not used, the space where the binocular optical system 5 is disposed is secured by the erecting relay optical system 4 in order to secure the brightness of the telescope 1 as much as possible, and thus the total length of the telescope 1 according to the present embodiment becomes long as shown in FIG. 6. In particular, the length of the optical path of the erecting relay optical system 4 becomes long. Here, the total length of the erecting relay optical system 4 is determined by the magnification and focal length thereof, so that the respective given spaces are secured between the image plane (the primary image plane A) of the objective optical system 2 and the second erecting relay lens 4b, and between the second erecting relay lens 4b and the secondary image plane B. Accordingly, in order to shorten the total length of the telescope 1 according to the present embodiment, the total length of the erecting relay optical system 4 is necessary to be shortened. Moreover, a given optical length must be secured between the second erecting relay lens 4b and the secondary image plane B, in order to dispose each prism composing the binocular optical system 5 therebetween and make the distance between the right and the left secondary images variable in accordance with the interpupillary distance of the right and left eyes, so that it is undesirable to shorten the given optical length. Accordingly, in the above-described erecting relay optical system 4, the total length is to be shortened by using a space between the image plane A of the objective optical system 2 and the second erecting relay lens 4b.

In the telescope 1 according to the present embodiment, the above-described optical path deflection optical system 3 is disposed between the objective optical system 2 and the optical path division prism 7, so that the total length is shortened by forming an optical path propagating to the object side by means of deflecting the optical path. Since the primary image A formed by the objective optical system 2 is erected by the erecting relay optical system 4, the erecting state of the image is secured by deflecting the optical path by an even number of times in the optical path deflection optical system 3.

In detail, in the telescope 1 according to the present embodiment, the total length is shortened, by the amount of ΔLA shown in the following expression. In the following expression, when LA1, LA2, LA3, LA4 are set to be excessively large, a distance between the optical axis of the objective optical system 2 and the optical axes of the left-eye optical system 5a and the right-eye optical system 5b becomes too large, so that a central image seen by the telescope 1 differs substantially from a central image of naked eye resulting in loss of operability of the telescope 1. For this reason, it is preferable that the total length is shortened by adjusting the amount of LA3 and LA4. In particular, LA3 is an optical path propagating in reverse direction, and thus contributes twice for shortening the total length.

$$\Delta LA = LA1 + LA2 + 2LA3 + LA4$$

Where LA1 denotes a distance along the optical axis from the first mirror 3a of the optical path deflection optical system 3 to the primary image plane A, LA2 denotes a distance along the optical axis from the primary image plane A to the second mirror 3b, LA3 denotes a distance along the optical axis from the second mirror 3b to the third mirror 3c, LA4 denotes a distance along the optical axis from the third mirror 3c to the fourth mirror 3d, and LA5 denotes a distance along the optical axis from the fourth mirror 3d to the last lens surface of the second erecting relay lens 4b.

In the telescope 1 according to the present embodiment, brightness of an observation image is determined by the pupil diameter of the eyepiece 10a, 10b installed in the left-eye optical system 5a and the right-eye optical system 5b. It is generally known that the pupil diameter of a person is about 2 mm in bright environment. When the pupil diameter of the eyepiece optical system 10a, 10b of the telescope 1 is smaller than the pupil diameter of a person, the observation image becomes darker than the case observed by a naked eye. If this tendency becomes excessive, the telescope 1 becomes difficult to be used.

Then, the erecting relay optical system 4 of the telescope 1 according to the present embodiment is constructed with satisfying the following conditional expression (1). Conditional expression (1) is for sufficiently securing brightness of the observation image with disposing the erecting relay optical system 4 closer to the objective optical system 2 as much as possible (a distance between the primary image plane A and the last lens surface of the erecting relay optical system 4 is made small as much as possible).

$$\beta \leq (2/3) \cdot (fe/fo) \cdot \phi o \quad (1)$$

Where $\beta$ denotes magnification of the erecting relay optical system 4, fo denotes a focal length of the objective optical system 2, $\phi o$ denotes an entrance pupil diameter (effective diameter) of the objective optical system 2, fe denotes a focal length of the eyepiece optical system 10a, 10b.

Derivation of conditional expression (1) is explained below.

Generally, a pupil diameter ($\phi e$) of a telescope is shown by the following expression, where magnification of the telescope is denoted by m:

$$\phi e = \phi o/m \quad (2).$$

Magnification m of the telescope is, as generally known, shown by the following expression:

$$m = fo/fe \quad (3).$$

Then, expression (2) becomes:

$$\phi e = \phi o \cdot fe/fo \quad (4).$$

In the present invention, the focal length fo of the objective optical system in expression (4) is corresponding to the focal length of the objective optical system 2 multiplied by the magnification of the erecting relay optical system 4. Accordingly, the pupil diameter $\phi e$ of the optical system according to the present invention is shown as follows:

$$\phi e = \phi o \cdot fe/(fo \cdot \beta) \quad (5).$$

As described above, it is undesirable that the pupil diameter is excessively smaller than the pupil diameter of an eye. Although the pupil diameter is preferably 2 mm or more, since a surveying telescope having the pupil diameter of 1.5 mm used in daytime shows little degradation in eyesight, $\phi e$ is set to 1.5 mm. Then, the following expression (6) is derived:

$$1.5 \leq \phi o \cdot fe/(fo \cdot \beta) \quad (6).$$

The expression is rewritten by the magnification $\beta$ of the relay optical system, so that expression (1) is derived:

$$\beta \leq (2/3) \cdot (fe/fo) \cdot \phi o \quad (1).$$

In order to use pleasantly, it is preferable that the pupil diameter is 2 mm or more, so that expression (1a) is derived:

$$\beta \leq (1/2) \cdot (fe/fo) \cdot \phi o \quad (1a).$$

As described above, the present embodiment makes it possible to realize the telescope 1 that is capable of making binocular observation of an image of an object formed by a single objective lens 2, user-friendly, and has a sufficiently compact total length with securing brightness of the image.

Second Embodiment

A telescope according to each of the following embodiments including a second embodiment is explained in detail, while the same construction as the first embodiment is attached the same reference symbol to omit duplicated explanations thereto.

Figure 3:
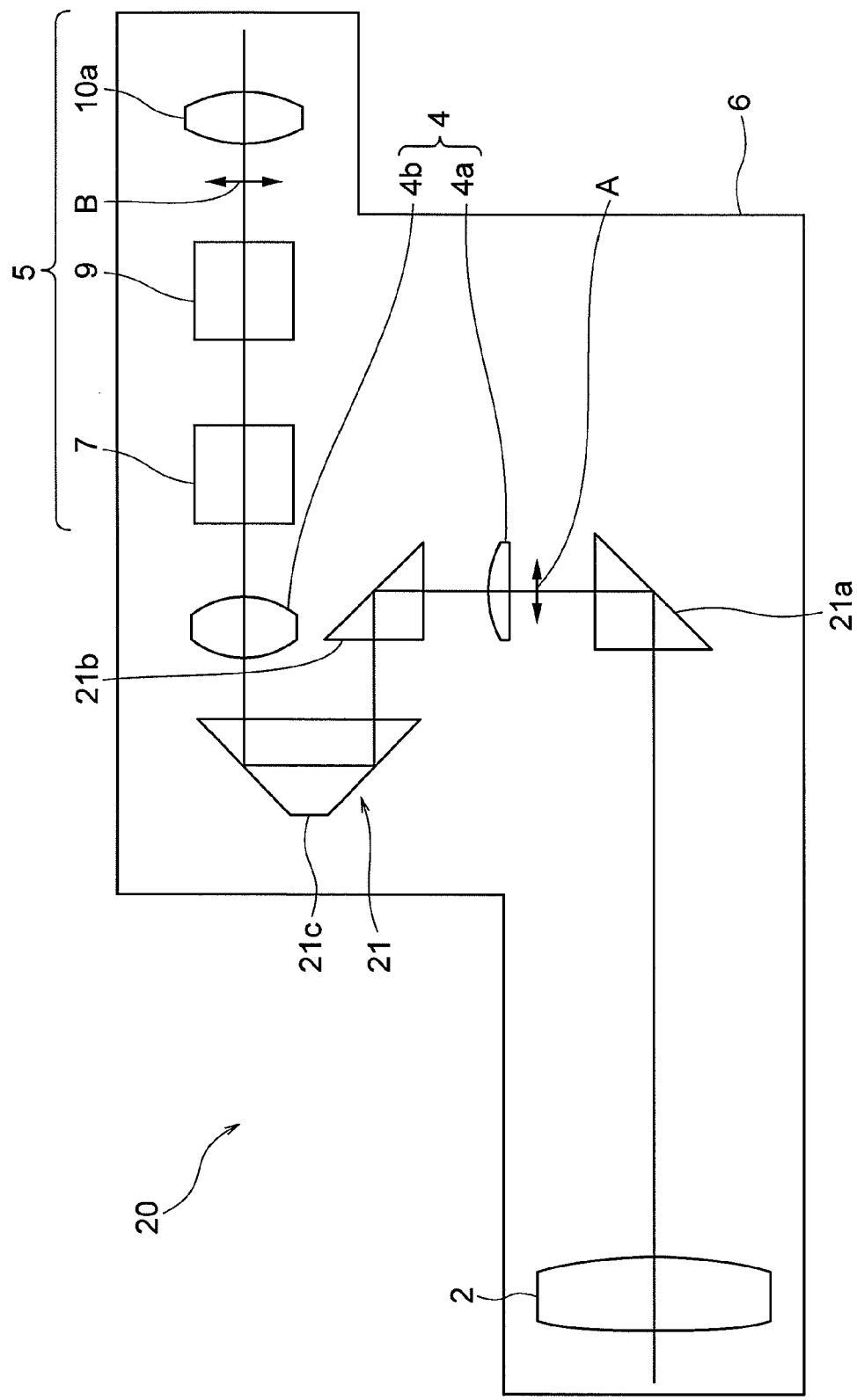
FIG. 3 is a side view showing a construction of a telescope according to a second embodiment of the present invention.

FIG. 3 is a side view showing a construction of a telescope according to a second embodiment of the present invention.

The telescope 20 according to the second embodiment is equipped with an optical path deflection optical system 21 different from the optical path deflection optical system 3 installed in the telescope 1 according to the above-described first embodiment.

As shown in FIG. 3, the optical path deflection optical system 21 of the telescope 20 according to the second embodiment is composed of a first-total-reflection prism 21a that reflects light from an objective optical system 2 perpendicularly (upward in FIG. 3), a second-total-reflection prism 21b that reflects light from the first-total-reflection prism 21a perpendicularly toward object side (left ward in FIG. 3), and a third-total-reflection prism 21c that reflects light from the second-total-reflection prism 21b in a direction parallel to an exit optical axis of the first-total-reflection prism 21a (upward in FIG. 3) and further reflects in a direction parallel to an optical axis of the objective optical system 2 (right ward in FIG. 3).

With this construction, the telescope 20 according to the present embodiment makes it possible to carry out the same effect as the first embodiment, and with equipping the optical path deflection optical system 21 composed of total reflection prisms 21a, 21b and 21c, decrease in light amount can be reduced within whole visible wavelength range in comparison with the case reflecting by reflection films, so that a brighter image of the object can be observed.

Although the optical path deflection optical system 21 of the telescope 20 according to the present embodiment is composed of only total reflection prisms, the invention is not limited to the construction, and the optical path deflection optical system may be constructed by combining mirrors with total reflection prisms.

Third Embodiment

Figure 4:
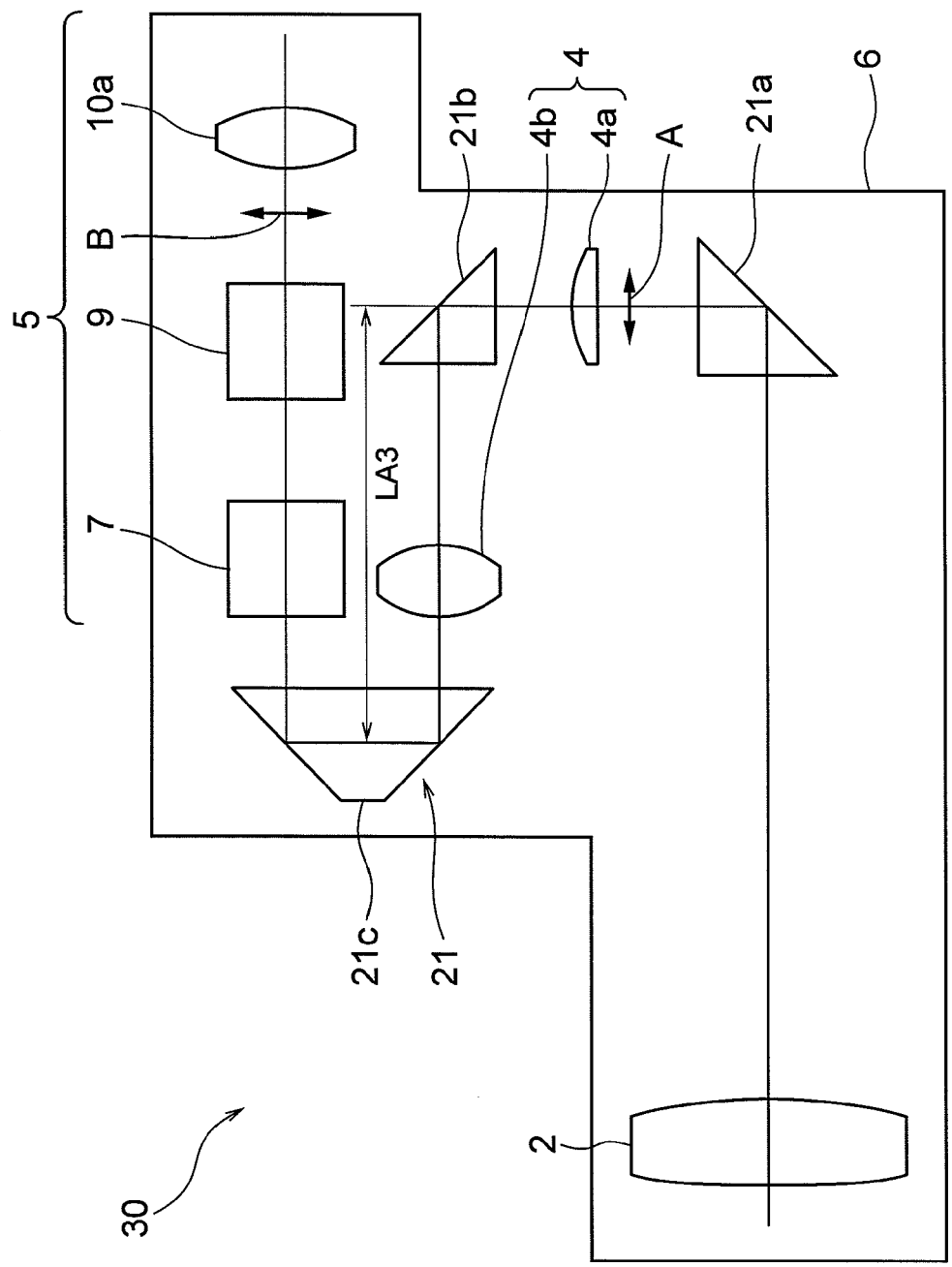
FIG. 4 is a side view showing a construction of a telescope according to a third embodiment of the present invention.

FIG. 4 is a side view showing a construction of a telescope according to a third embodiment of the present invention.

The telescope 30 according to the third embodiment is equipped with an optical path deflection optical system 21 similar to the second embodiment. As shown in FIG. 4, a second erecting relay lens 4b is disposed on an optical path between a second-total-reflection prism 21b and a third-total-reflection prism 21c, so that a distance from the second-total-reflection prism 21b to the third-total-reflection prism 21c is largely secured in comparison with each of the above-described embodiments.

With this construction, the telescope 30 according to the third embodiment makes it possible to carry out the same effect as the second embodiment, and optical members after the optical path division prism 7 can be disposed closer to the third-total-reflection prism 21c, so that the total length can further be shortened.

Fourth Embodiment

Figure 5:
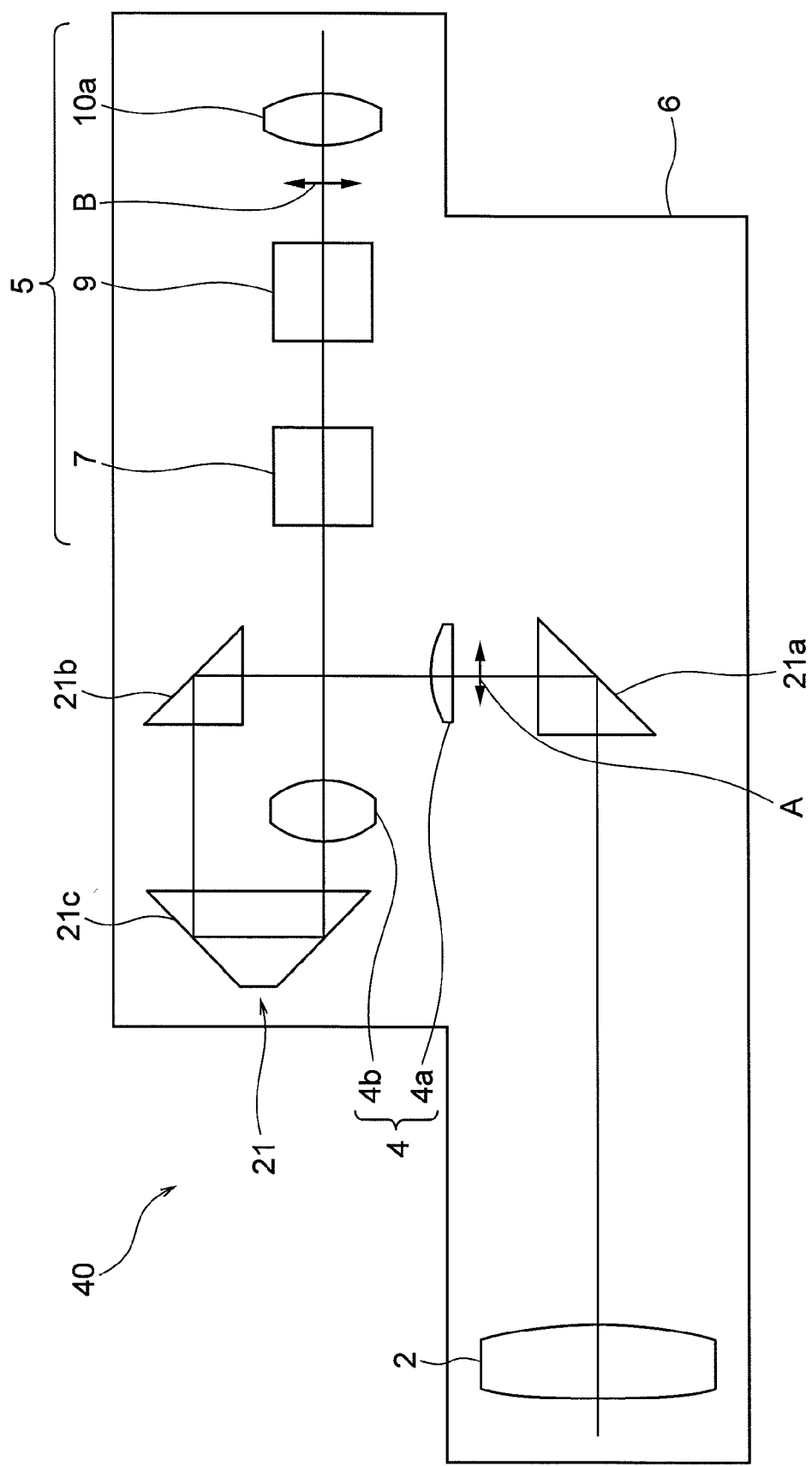
FIG. 5 is a side view showing a construction of a telescope according to a fourth embodiment of the present invention.

FIG. 5 is a side view showing a construction of a telescope according to a fourth embodiment of the present invention.

The telescope 40 according to the fourth embodiment is equipped with an optical path deflection optical system 21 similar to the above-described second embodiment, and, as shown in FIG. 5, a third-total-reflection prism 21c is disposed to reflect light from a second-total-reflection prism 21b in a direction parallel to an exit optical axis of a first-total-reflection prism 21a (downward in FIG. 5 opposite to the second embodiment) and further reflect in a direction parallel to an optical axis of an objective optical system 2 (right ward in FIG. 5).

With this construction, the telescope 40 according to the fourth embodiment makes it possible to carry out the same effect as the second embodiment. With crossing the optical path from the first-total-reflection prism 21a to the second-total-reflection prism 21b with the exit optical axis of the third-total-reflection prism 21c, it becomes possible to make the exit optical axis of the third-total-reflection prism 21c closer to the optical axis of the objective optical system 2. Accordingly, since a distance from each optical axis of eyepiece optical systems 10a, 10b of the left-eye optical system 5a and the right-eye optical system 5b to the optical axis of the objective optical system 2 can be small, parallax between an observation with the present telescope and an observation with naked eyes can be reduced, so that the field of view of the telescope can easily be adjusted to an object aimed by a user.

Fifth Embodiment

Figure 7:
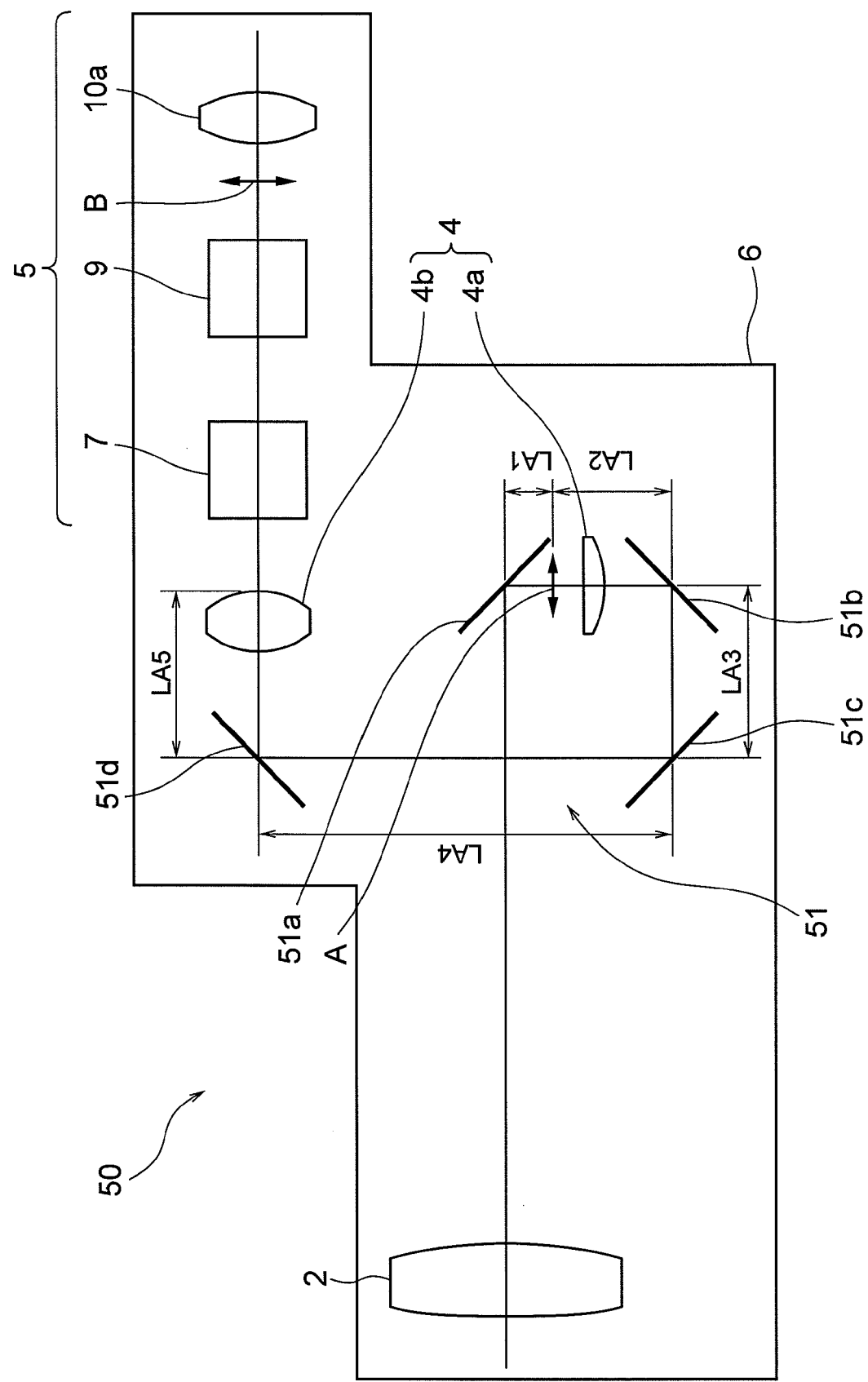
FIG. 7 is a side view showing a construction of a telescope according to a fifth embodiment of the present invention.
Figure 8:
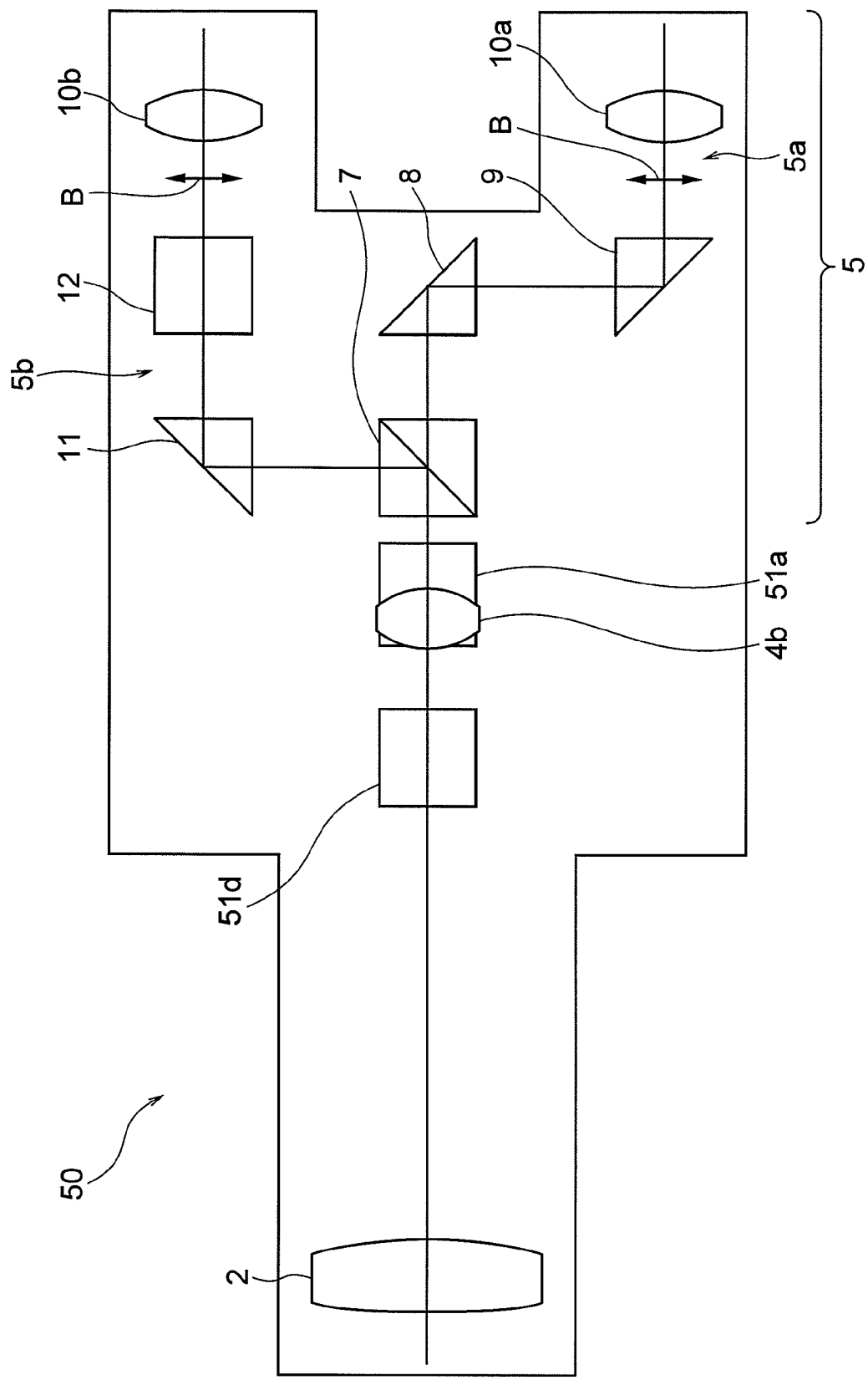
FIG. 8 is a top view showing a construction of a telescope according to the fifth embodiment of the present invention.

FIGS. 7 and 8 are a side view and a top view, respectively, showing a construction of a telescope according to a fifth embodiment of the present invention.

The telescope 50 according to the fifth embodiment is equipped with an optical path deflection optical system 51 different from the optical path deflection optical system installed in the telescope according to each of the above-described embodiments.

As shown in FIG. 7, the optical path deflection optical system 51 of the telescope 50 according to the present embodiment is composed of a first mirror 51a that reflects light from an objective optical system 2 perpendicularly (downward in FIG. 7), a second mirror 51b that reflects light from the first mirror 51a perpendicularly toward the object side (left ward in FIG. 7), a third mirror 51c that reflects light from the second mirror 51b in a direction parallel to the reflection optical axis of the first mirror 51a (upward in FIG. 7), and a fourth mirror 51d that reflects light from the third mirror 51c in a direction parallel to the optical axis of the objective optical system 2 (right ward in FIG. 7).

The optical path deflection optical system 51 is constructed to dispose the mirrors such that a distance LA4 from the third mirror 51c to the fourth mirror 51d is set to be larger than a distance (LA1+LA2) from the first mirror 51a to the second mirror 51b, and thus the optical path between the objective optical system 2 and the first mirror 51a crosses substantially perpendicularly to the optical path between the third mirror 51c and the fourth mirror 51d.

With this construction, the telescope 50 according to the fifth embodiment makes it possible to carry out the same effect as the first embodiment. Moreover, as described above, since the distance (LA4) from the third mirror 51c to the fourth mirror 51d is made larger than the distance from the first mirror 51a to the second mirror 51b (LA1+LA2), the distance LA3 from the second mirror 51b to the third mirror 51c can be made small. Accordingly, in the telescope 50 according to the fifth embodiment, the optical path deflection optical system 51 can be disposed sufficiently away from the objective optical system 2. This is, upon manufacturing the telescope 50, effective for preventing physical interference between a holding member of the objective optical system 2 and a holding member of the optical path deflection optical system 51, for applying a zoom mechanism or a vibration reduction mechanism into the objective optical system 2, and for applying an interchangeable lens exchangeably as the objective optical system 2.

Sixth Embodiment

Figure 9:
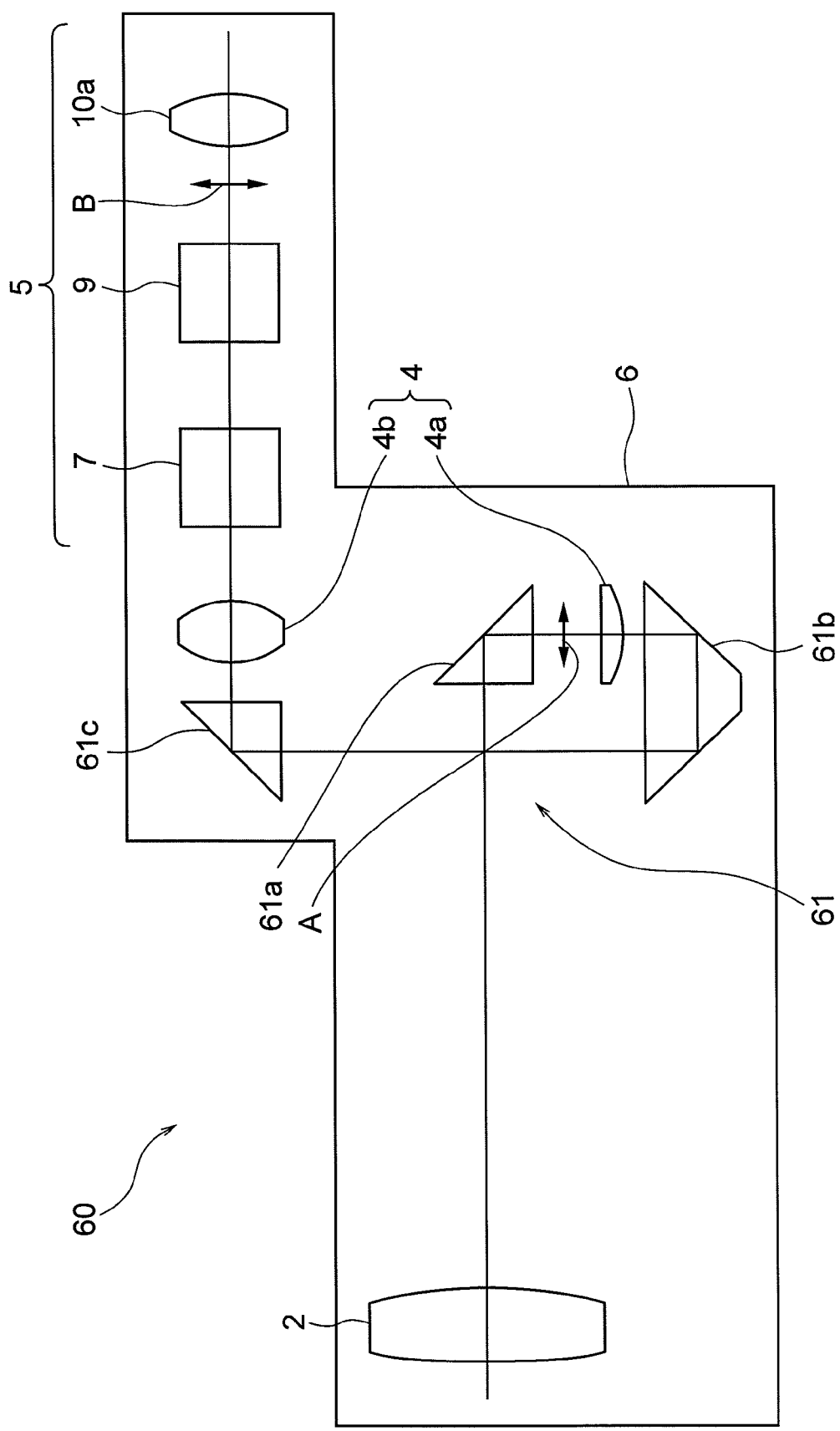
FIG. 9 is a side view showing a construction of a telescope according to a sixth embodiment of the present invention.

FIG. 9 is a side view showing a construction of a telescope according to a sixth embodiment of the present invention.

The telescope 60 according to the sixth embodiment is equipped with an optical path deflection optical system 61 different from the optical path deflection optical system according to each of the above-described embodiments.

As shown in FIG. 9, the optical path deflection optical system 61 is composed of a first-total-reflection prism 61a that reflects light from an objective optical system 2 perpendicularly (downward in FIG. 9), a second-total-reflection prism 61b that reflects light from the first-total-reflection prism 61a perpendicularly toward the object side (left ward in FIG. 9) and further reflects in a direction parallel to an exit optical axis of the first-total-reflection prism 61a (upward in FIG. 9), and a third-total-reflection prism 61c that reflects light from the second-total-reflection prism 61b in a direction parallel to the optical axis of the objective optical system 2 (right ward in FIG. 9).

With setting a distance from the second-total-reflection prism 61b to the third-total-reflection prism 61c longer than a distance from the first-total-reflection prism 61a to the second-total-reflection prism 61b, the optical path deflection optical system 61 has a prism arrangement that an optical path between the objective optical system 2 and the first-total-reflection prism 61a crosses substantially perpendicularly to an optical path between the second-total-reflection prism 61b and the third-total-reflection prism 61c.

With this construction, the telescope 60 according to the sixth embodiment makes it possible to carry out the same effect as the fifth embodiment.

With equipping the optical path deflection optical system 61 composed of total reflection prisms 61a, 61b and 61c, decrease in light amount can be reduced within whole visible wavelength range in comparison with the case reflecting by reflection films (mirrors), so that a brighter image can be observed.

Although the optical path deflection optical, system 61 of the telescope 60 according to the present embodiment is composed of only total reflection prisms, the invention is not limited to the construction, and the optical path deflection optical system may be constructed by combining mirrors with total reflection prisms.

Seventh Embodiment

Figure 10:
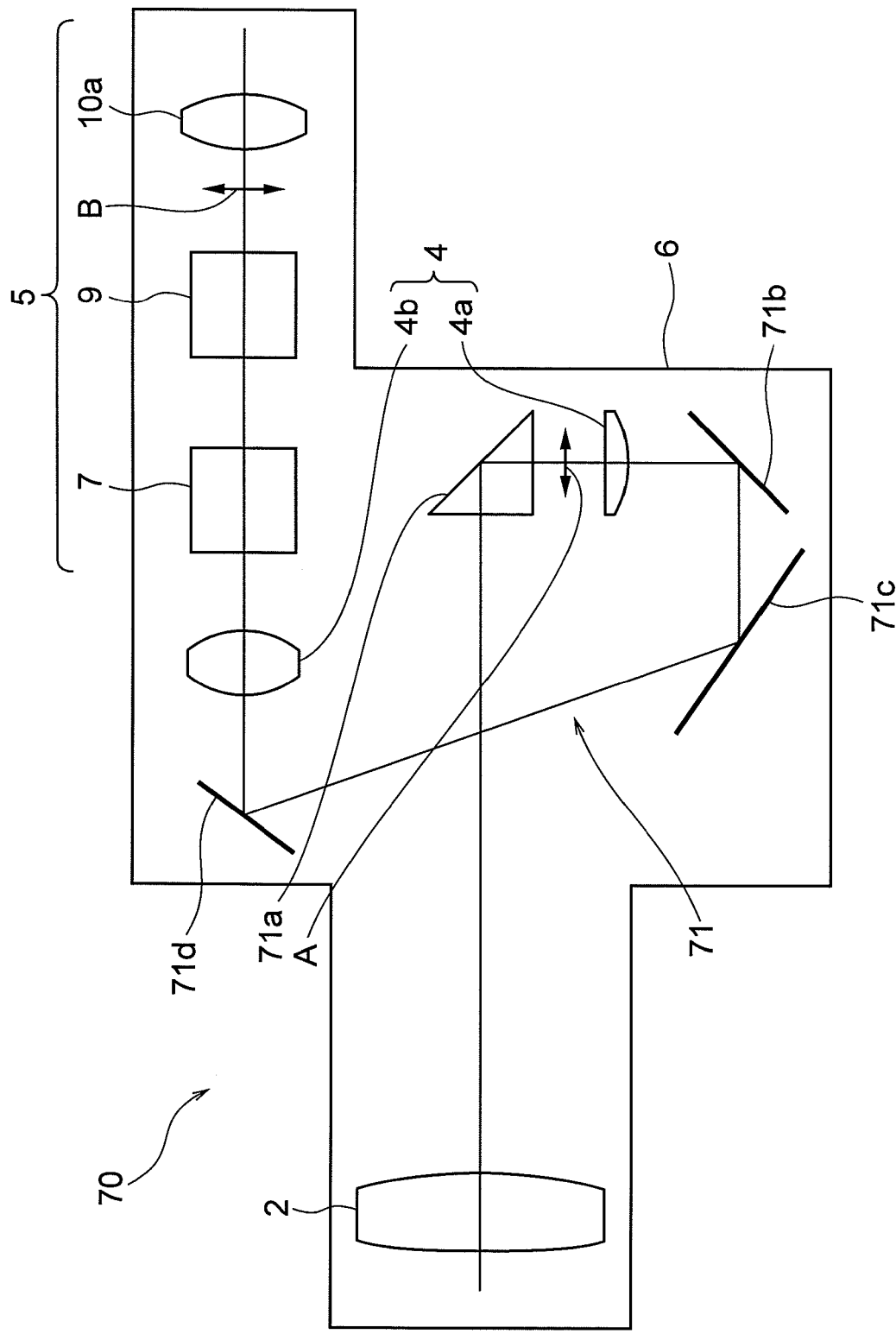
FIG. 10 is a side view showing a construction of a telescope according to a seventh embodiment of the present invention.

FIG. 10 is a side view showing a construction of a telescope according to a seventh embodiment of the present invention.

The telescope 70 according to the seventh embodiment is equipped with an optical path deflection optical system 71 different from the optical path deflection optical system according to each of the above-described embodiments.

As shown in FIG. 10, the telescope 70 according to the present embodiment is composed of a total reflection prism 71a that reflects light from an objective lens 2 perpendicularly (downward in FIG. 10), a first mirror 71b that reflects light from the total reflection prism 71a perpendicularly toward the object side (left ward in FIG. 10), a second mirror 71c that reflects light from the first mirror 71b diagonally to the object side (diagonally upward in FIG. 10) such that an incident optical axis makes an obtuse angle with an exit optical axis, and a third mirror 71d that reflects light from the second mirror 71c in a direction parallel to an optical axis of the objective optical system 2 (right ward in FIG. 10).

With this construction, the telescope 70 according to the present embodiment makes it possible to carry out the same effect as the fifth embodiment.

As described above, with reflecting light from the first mirror 71b diagonally to the object side by the second mirror 71c, the mirror arrangement makes an optical path between the objective optical system 2 and the total reflection prism 71a crosses diagonally with an optical path between the second mirror 71c and the third mirror 71d. Accordingly, a distance between the second mirror 71c and the third mirror 71d is made further larger than the distance LA4 between the third mirror 51c and the fourth mirror 51d in the fifth embodiment, so that the total length can further be shortened.

As described above, each embodiment makes it possible to realize a user-friendly, compact telescope capable of making binocular observation of an image of an object formed by a single objective lens.

Moreover, in the telescope according to any of the above-described embodiments, when the first mirror 3a of the optical path deflection optical system 3 (the first-total-reflection prism 21a of the optical path deflection optical system 21, the first mirror 51a of the optical path deflection optical system 51, the first-total-reflection prism 61a of the optical path deflection optical system 61, or the total reflection prism 71a of the optical path deflection optical system 71) is made to be a semi-transparent mirror or a quick-return mirror, and a photodetector or an imaging device is disposed on the primary image plane formed on the transmission optical path of the first mirror 3a, an auto focus optical system or a digital camera optical system can be constructed.

Moreover, in the telescope according to any of the above-described embodiments, the first erecting relay lens 4a of the erecting relay optical system 4 has the above-described effect of leading the light flux from the objective optical system 2 to the second erecting relay lens 4b effectively to make the second erecting relay lens 4b compact. However, the first erecting relay lens 4a is not indispensable, and may be omitted to make the total length further shortened.

Eighth Embodiment

Figure 11:
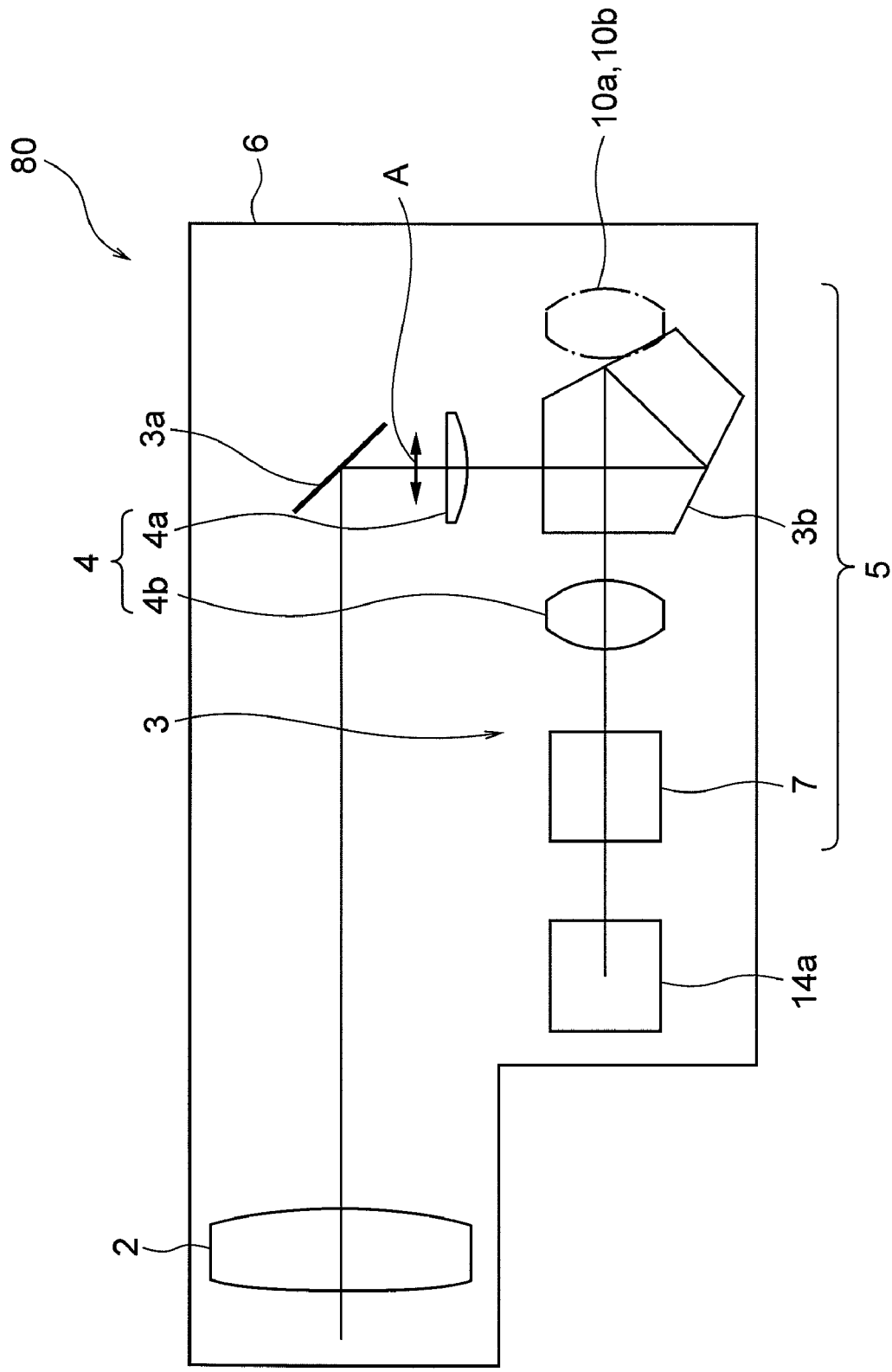
FIG. 11 is a side view showing a construction of a telescope according to an eighth embodiment of the present invention.
Figure 12:
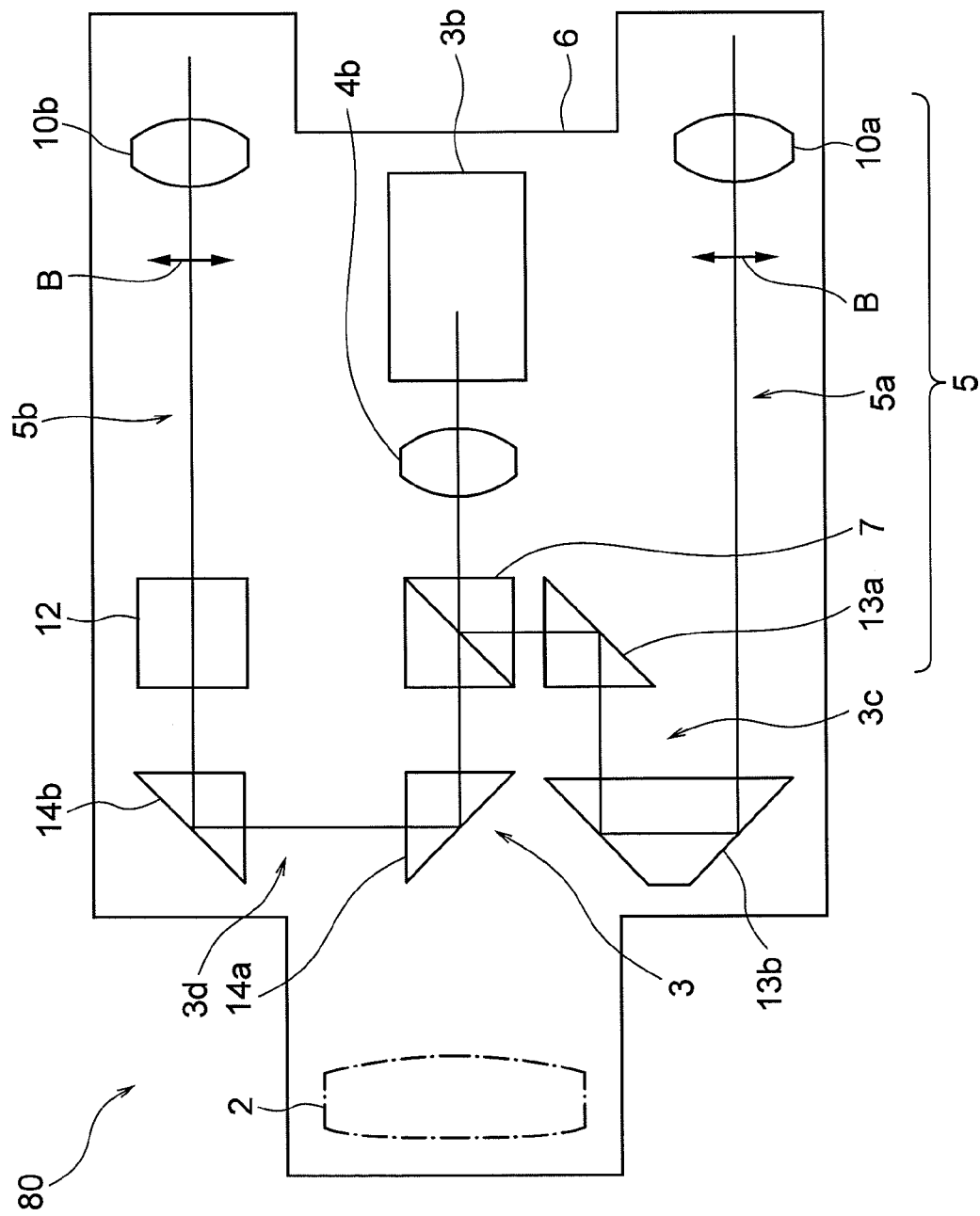
FIG. 12 is a top view showing a construction of a telescope according to the eighth embodiment of the present invention.

FIGS. 11 and 12 are a sectional view and a top view, respectively, showing a construction of a telescope according to an eighth embodiment of the present invention.

The telescope 80 according to the eighth embodiment is equipped with an objective optical system 2, an optical path deflection optical system 3, a relay optical system 4, and a binocular optical system 5 in a housing 6.

The objective optical system 2 is a lens for converging light from an unillustrated object to form a primary image (reversed image) A of the object and is disposed to the most object side.

The optical path deflection optical system 3 is composed of a mirror 3a that reflects light from the objective optical system 2 perpendicularly (downward in FIG. 11), and a pentagonal roof prism 3b that reflects light from the mirror 3a perpendicularly toward the object side (left ward in FIG. 11) to lead toward an optical path division prism 7 explained later, as shown in FIG. 11, and a pair of total reflection prism systems 3c and 3d that reflect light divided by the optical path division prism 7 in a direction parallel to the optical axis of the objective optical system 2 toward respective image sides (right ward in FIG. 12) as shown in FIG. 12.

In further detail, the pentagonal roof prism 3b reflects light from the mirror 3a at first to the image side, and then in a direction parallel to the optical axis of the objective optical system 2 (left ward in FIG. 11). The pentagonal roof prism 3b has a function to erect the image of the object reversed right and left by an optical system after the pentagonal roof prism 3b.

The total reflection prism system 3c among the total reflection prism systems 3c and 3d is composed of a total reflection prism 13a that reflects light reflected from the optical path division prism 7 perpendicularly toward the object (left ward in FIG. 12), and a total reflection prism 13b that reflects light from the total reflection prism 13a perpendicularly (downward in FIG. 12) and reflects in a direction parallel to the optical axis of the objective optical system 2 (right ward in FIG. 12) to lead to the left-eye optical system 5a explained later. The total reflection prism system 3d is composed of a total reflection prism 14a that reflects light transmitted through the optical path division prism 7 perpendicularly (upward in FIG. 12), and a total reflection prism 14b that reflects light from the total reflection prism 14a perpendicularly in a direction parallel to the optical axis of the objective optical system 2 (right ward in FIG. 12) to lead to the right-eye optical system 5b explained later.

The relay optical system 4 is for forming a secondary image B by means of converging light which has formed a primary image A of the object, and composed of a first relay lens 4a that is disposed in the vicinity of the primary image A between the mirror 3a and the pentagonal roof prism 3b, and a second relay lens 4b that is used as an imaging lens and disposed right behind the pentagonal roof prism 3b.

The first relay lens 4a is a field lens for forming an exit pupil of the objective optical system 2 in the vicinity of the second relay lens 4b in order to effectively lead light flux from the objective optical system 2 to the second relay lens 4b.

As shown in FIG. 12, the binocular optical system 5 is composed of an optical path division prism 7 that divides the optical path of the relay optical system 4 (the optical path from the primary image A to the secondary image B of the object) into two, a left-eye optical system 5a that is disposed on the reflection optical path of the optical path division prism 7, and a right-eye optical system 5b that is disposed on the transmission optical path of the optical path division prism 7, and together with the above-described total reflection prism systems 3c and 3d, forms a so-called Seidentopf type optical system known widely as a binocular eyepiece tube of a microscope. The left-eye optical system 5a is composed of only an eyepiece optical system 10a. On the other hand, the right-eye optical system 5b is composed of a quadrilateral prism 12 for correcting optical path difference from the left-eye optical system 5a, and an eyepiece optical system 10b.

Moreover, each of the left-eye optical system 5a and the right-eye optical system 5b is movably provided around an unillustrated mechanical axis disposed parallel to the optical axis of the objective optical system 2. In detail, in the present embodiment, the mechanical axis for the left-eye optical system 5a is set on an extension line of an incident optical axis of the total reflection prism 14a, so that the optical path division prism 7, the prism 13a and the total reflection prism 13b can be rotated in a body around the axis. On the other hand, the mechanical axis for the right-eye optical system 5b is set on an extension line of an incident optical axis of the total reflection prism 14a, so that the total reflection prism 14a, the total reflection prism 14b, and the quadrilateral prism 12 can be rotated in a body around the axis. With this construction, a user of the telescope 80 according to the eighth embodiment makes it possible to adjust the distance between the left-eye optical system 5a and the right-eye optical system to the interpupillary distance of the user by rotating them around the respective mechanical axes.

In the telescope 80 according to the eighth embodiment having the construction described above, light from the unillustrated object is converged by the objective optical system 2 to form the primary image A after reflected by the mirror 3a. Light which has formed the primary image A passes through the first relay lens 4a, is reflected by the pentagonal roof prism, passes through the second relay lens 4b, and is divided by the optical path division prism 7. Light reflected by the optical path division prism 7 is reflected by the total reflection prisms 13a and 13b, led to the left-eye optical system 5a, and forms the secondary image B. On the other hand, light transmitted through the optical path division prism 7 is reflected by the total reflection prisms 14a and 14b, led to the right-eye optical system 5b, and after passing through the quadrilateral prism 12 forms the secondary image B similar to the left-eye optical system 5a. Accordingly, the user of the telescope 80 can observe an erected image of the object by looking through the eyepiece optical systems 10a and 10b of the left-eye optical system 5a and the right-eye optical system 5b.

As described above, in the telescope 80 according to the eighth embodiment, with relaying the primary image A formed by the objective optical system 2 by means of the relay optical system 4, a space for disposing the binocular optical system 5 is secured in the optical path without making longer the focal length of the objective optical system 2.

Incidentally, in a case the optical path deflection system 3 is not employed, the total length of the telescope 80 according to the present embodiment inevitably becomes longer as shown in FIG. 6 in order to secure brightness of the telescope 80 as much as possible with securing the space for disposing the binocular optical system 5 by the relay optical system 4. In particular, the length of the optical path of the relay optical system 4 becomes long. Here, the total length of the relay optical system 4 is determined by magnification and the focal length thereof, and respective given spaces are secured between the image plane (primary image plane A) of the objective optical system 2 and the second relay lens 4b, and between the second relay lens 4b and the secondary image plane B as shown in FIG. 6. Accordingly, in order to make the total length of the telescope 80 according to the eighth embodiment short as much as possible, it is necessary to shorten the total length of the relay optical system 4 as well as the total length of the binocular optical system 5.

In the telescope 80 according to the eighth embodiment, the optical path deflection optical system 3 having the above-described construction is provided to the image side of the objective optical system 2. With forming optical paths propagating toward the object side by deflecting the optical path by means of the optical path deflection optical system 3 (hereinafter the optical path is called as a "deflection optical path") in the relay optical system 4 and the binocular optical system 5, the total lengths of these optical systems 4 and 5 are shortened.

The telescope 80 according to the eighth embodiment has a construction that the optical path deflection optical system 3 deflects optical path of the relay optical system 4 to form the above-mentioned deflection optical path, and the optical path division prism 7 is disposed in the deflection optical path. Accordingly, the optical path between the second relay lens 4b and the optical path division prism 7 is also the deflection optical path, in other words, the deflection optical path can be formed from the relay optical system 4 to the binocular optical system 5, so that the total length of the telescope 80 can be shortened to the maximum extent.

As described above, the present embodiment makes it possible to realize a user-friendly telescope 80 capable of making binocular observation of an image of an object formed by a single objective optical system 2 with making the total length shortened to the maximum extent with securing brightness of the image.

Moreover, as described above, since the telescope 80 according to the present embodiment makes it possible to sufficiently shorten the total length by the deflection optical path formed from the relay optical system 4 to the binocular optical system 5, the distance between the mirror 3a and the pentagonal roof prism 3b in the optical path deflection optical system 3 can be small. Accordingly, the distance between the optical axis of the objective optical system 2 and each of the optical axes of the left-eye optical system 5a and the right-eye optical system 5b can be small, parallax between an observation with the telescope and an observation with naked eyes can be reduced, so that the field of view of the telescope can easily be adjusted to an object aimed by a user, and the total length in up and down direction of the telescope 80 (up and down direction in FIG. 11) can also be shortened.

Ninth Embodiment

Figure 13:
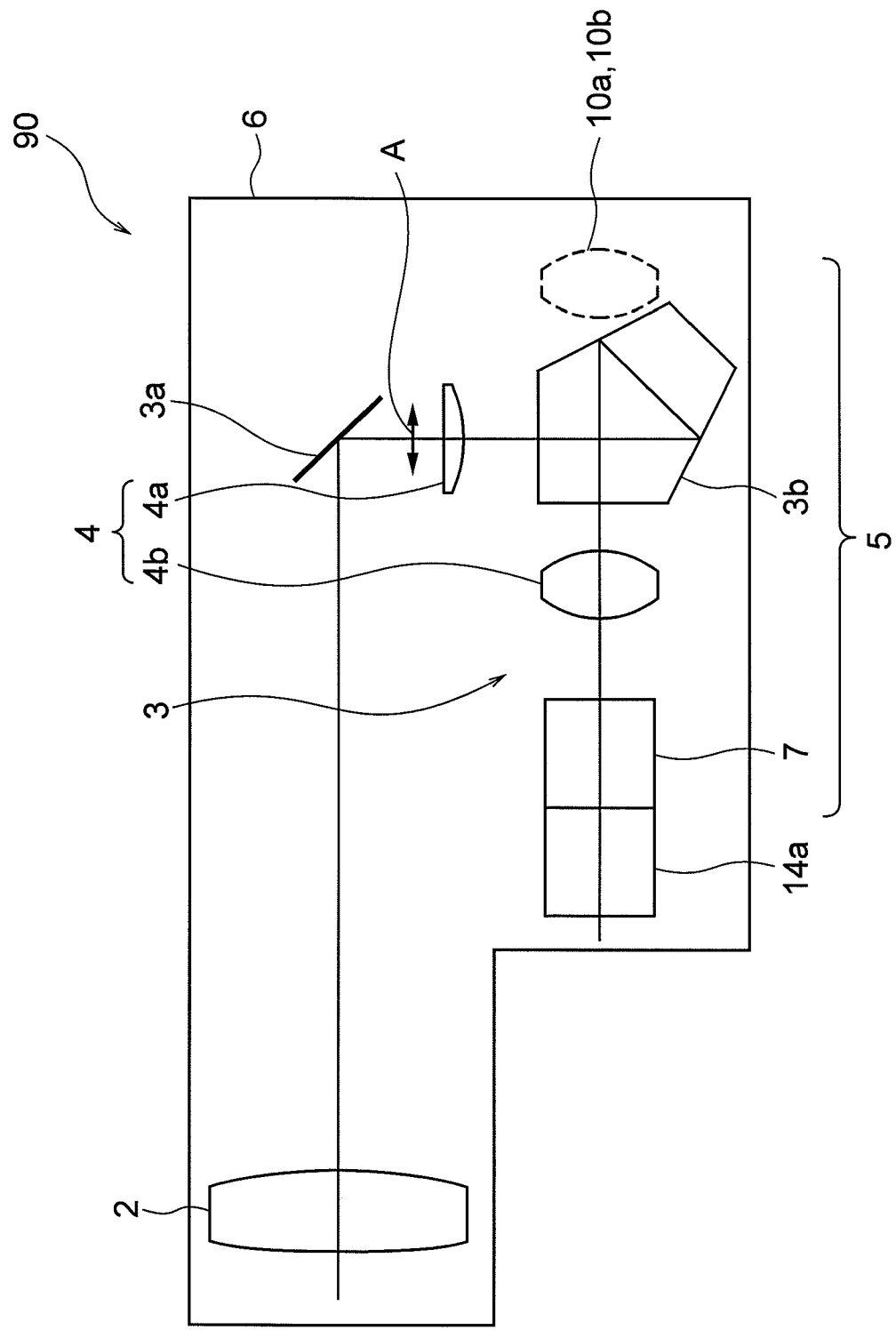
FIG. 13 is a side view showing a construction of a telescope according to a ninth embodiment of the present invention.
Figure 14:
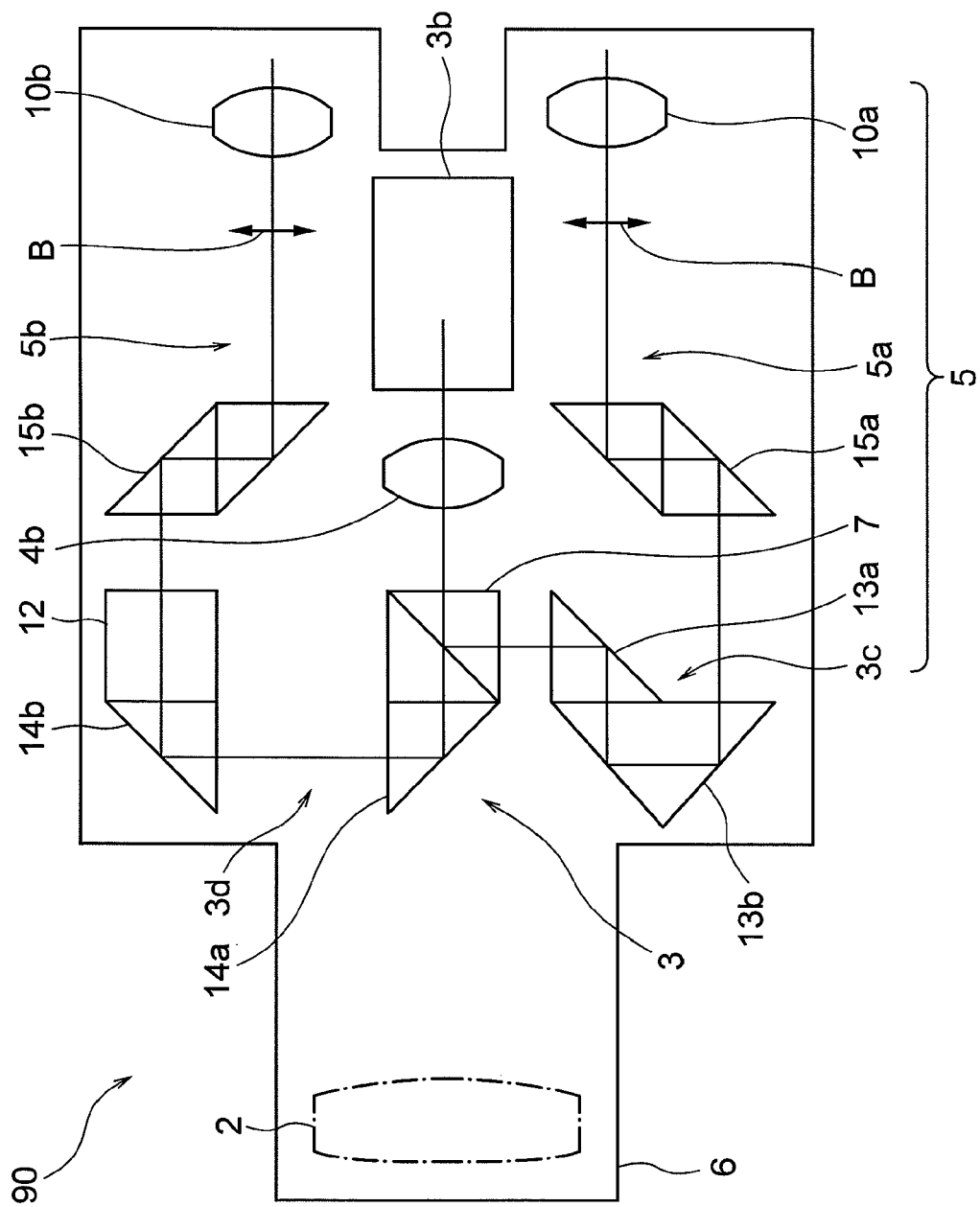
FIG. 14 is a top view showing a construction of a telescope according to the ninth embodiment of the present invention.

FIGS. 13 and 14 are a sectional view and a top view, respectively, showing a construction of a telescope according to a ninth embodiment of the present invention.

In the telescope 90 according to the ninth embodiment, an exit surface of a total reflection prism 13a and an incident surface of a total reflection prism 13b are cemented, an exit surface of an optical path division prism 7 and an incident surface of a total reflection prism 14a are cemented, and an exit surface of a total reflection prism 14b and an incident surface of a quadrilateral prism 12 are cemented.

In the telescope 90 according to the ninth embodiment, a total reflection prism 15a that reflects light from a total reflection prism 13b perpendicularly (upward in FIG. 14) and further reflects in a direction parallel to an optical axis of an objective optical system 2 (right ward in FIG. 14) is installed in a left-eye optical system 5a. A total reflection prism 15b that reflects light from a quadrilateral prism 12 perpendicularly (downward in FIG. 14) and further reflects in a direction parallel to the optical axis of the objective optical system 2 (right ward in FIG. 14) is installed in a right-eye optical system 5b.

The left-eye optical system 5a and the right-eye optical system 5b are made rotatable respectively around unillustrated mechanical axes disposed parallel to the optical axis of the objective optical system 2 similar to the eighth embodiment. Specifically, in the left-eye optical system 5a, an mechanical axis is set on the extension line of an exit optical axis of the total reflection prism 13b, and an eyepiece optical system 10a and a total reflection prism 15a can be rotated around that mechanical axis in a body. Moreover, in the right-eye optical system 5b, a mechanical axis is set on the extension line of an exit optical axis of the quadrilateral prism 12, and an eyepiece optical system 10b and a total reflection prism 15b can be rotated around that mechanical axis in a body. With this construction, a user of the telescope 90 according to the ninth embodiment makes it possible to adjust the distance between the left-eye optical system 5a and the right-eye optical system 5b to the interpupillary distance of the user by rotating them around the respective mechanical axes.

With this construction described above, the telescope 90 according to the ninth embodiment makes it possible to carry out the same effect as the eighth embodiment described above. Upon adjusting the interpupillary distance, only common optical components in the left-eye optical system 5a and the right-eye optical system 5b (eyepiece optical system 10a, total reflection prism 15a, eyepiece optical system 10b and total reflection prism 15b) are rotated, so that a construction more suitable for interpupillary distance adjustment can be realized, and the rotation mechanism can be simplified.

As described above, each embodiment described above makes it possible to realize a telescope capable of making binocular observation of an image of an object formed by a single objective optical system with making the total length shortened.

In a telescope according to each embodiment described above, when the mirror 3a of the optical path deflection optical system 3 is made to be a semi-transparent mirror or a quick-return mirror, and a photodetector or an imaging device is disposed on a primary image plane formed on a transmission optical path of the mirror 3a, an auto focus optical system or a digital camera optical system can be constructed.

In a telescope according to each embodiment described above, the first relay lens 4a of the relay optical system 4 effectively leads the light flux from the objective optical system 2 to the second relay lens 4b as described above, and effectively makes the second relay lens 4b compact. However, the first relay lens 4a is not indispensable, so that the lens can be omitted to make the total length further compact.

In a telescope according to each embodiment described above, although total reflection prisms 3c and 3d in the optical path deflection optical system 3 are respectively constructed only by total reflection prisms, the invention is not limited to the construction, and the optical path deflection optical system may be constructed by combining mirrors with total reflection prisms or by mirrors only.

Tenth Embodiment

Figure 15:
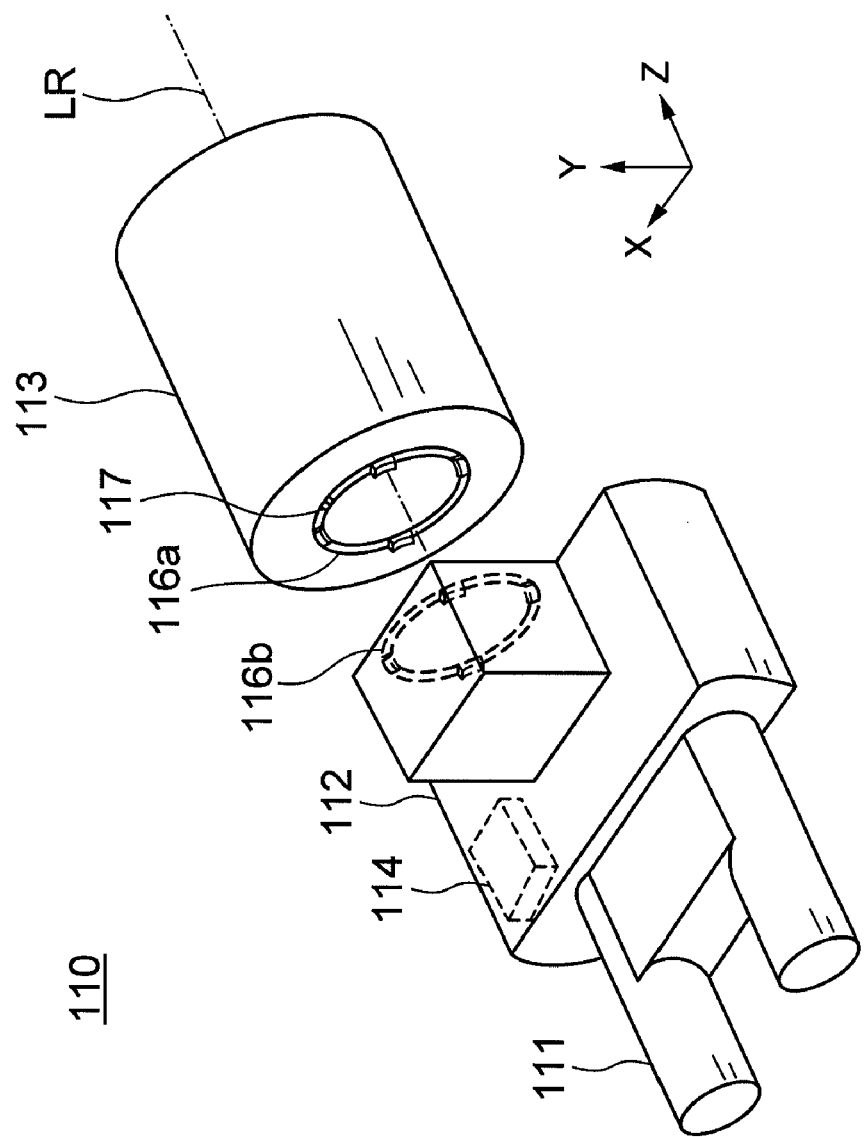
FIG. 15 is a perspective view showing the telescope according to the present invention.

FIG. 15 is a perspective view showing the telescope 110 according to the present embodiment. The telescope 110 is composed of a binocular portion 111, a body portion 112 and an interchangeable lens portion 113, which is an objective optical system. The binocular portion 111 is equipped with left and right eyepiece tubes for observing with both eyes, and the eyepiece tubes can be adjustable to an interpupillary distance of an observer. The body portion 112 is formed with an optical system having a single optical path and is composed of a plurality of mirrors and lenses. In the body portion 112, a controller portion 114 that carries out various kinds of control is provided. In the interchangeable lens portion 113, lenses having different specifications such as a single focal length lens and a zoom lens can be attached in accordance with the intended use. For example, the interchangeable lens portion 113 is equipped with an auto focus (AF) mechanism, and a vibration reduction (VR) mechanism.

A mount portion 116 is formed on the body portion 112, and a mount portion 116a of a lens side can be fitted to a mount portion 116b of the body side. When the mount portion 116 is made in a common shape with a mount portion of a single-lens reflex, an interchangeable lens for a single-lens reflex camera manufactured conventionally can be used. A connector 117 is formed on the mount portion 116. The connector 117 of the mount portion 116 is used in a state where the body portion 112 and the interchangeable lens portion 113 are electrically connected for obtaining information of the connected interchangeable lens portion 113, supplying power, and transmitting calculated result from the body portion 112. For example, the connector 117 of the mount portion 116 transmits an optimum moving amount of auto focus (AF) for the interchangeable lens portion 113, which is calculated by the controller portion 114 of the body portion 112, to the interchangeable lens portion 113. A motor in the interchangeable lens portion 113 drives focusing lens in accordance with transmitted signal.

The body-side mount portion 116b of the telescope 110 is made to be a shape suitable for the lens-side mount portion 116a of a single-lens reflex camera. Accordingly, an observer can attach various kinds of interchangeable lens portion 113 of a single-lens reflex camera to the body portion 112 in accordance with an intended use. In an interchangeable lens for a single-lens reflex camera, a large number of, or a wide variety of them have been produced until now, and there are a lot of observers. For example, there are a wide variety of interchangeable lenses such as a macro interchangeable lens, an interchangeable lens with a vibration reduction function, a zoom interchangeable lens and a high magnification interchangeable lens. Accordingly, with purchasing a body portion 112, an observer can use a high performance, high function interchangeable lens for a single-lens reflex camera with fitting it to the body portion 112. The observer can change magnification and diameter of the interchangeable lens if necessary, so that the observer can customize it to the optimum telescope 110 for the intended purpose. For example, when a macro interchangeable lens is attached to the body portion 112, it is used as a microscope. When a zoom interchangeable lens with a standard or a middle telephoto focal length is used, it is used as a telescope 110 for observing a landscape. When a middle or long focal length interchangeable lens with a large diameter is used, it becomes a telescope for an astronomical observation.

Figure 16:
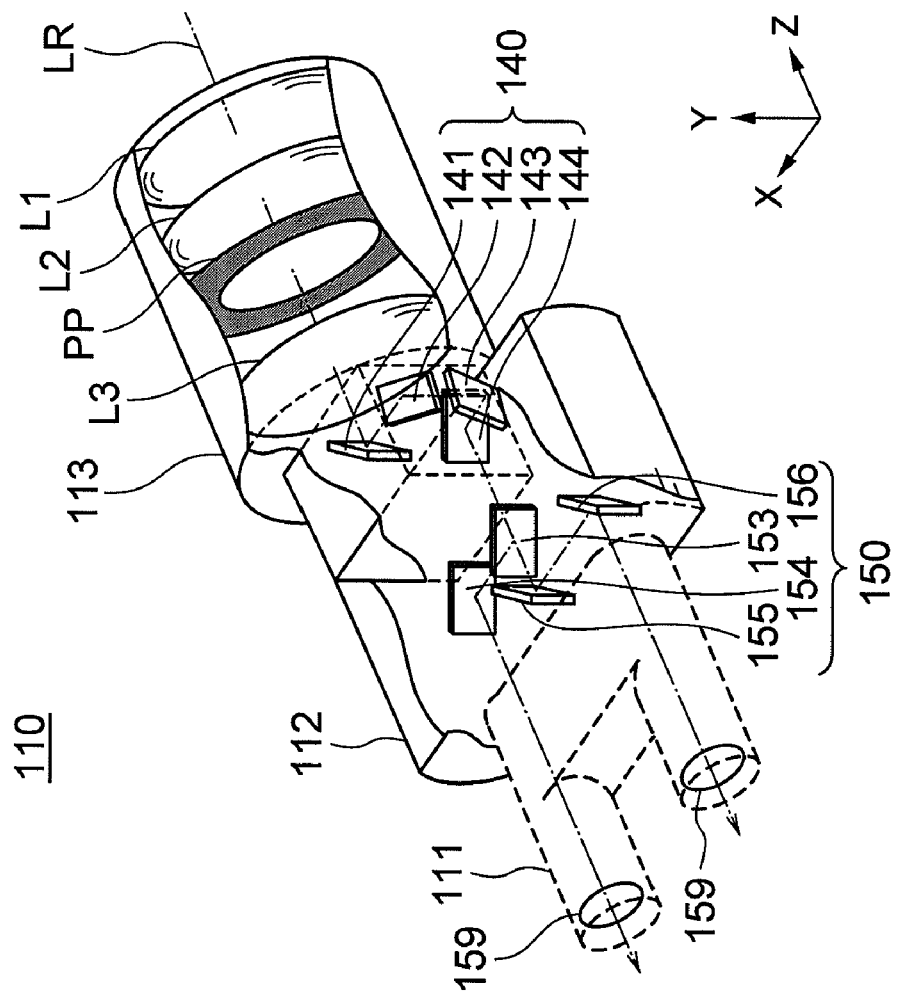
FIG. 16 is a view showing a state where an interchangeable lens portion is fitted to a body portion in the telescope according to the present invention.

FIG. 16 is a view showing a state where an interchangeable lens portion 113 is fitted to a body portion 112, and showing an optical path LR of external light incident on the telescope 110. The interchangeable lens portion 113 is composed of a first lens group L1, a second lens group L2, a third lens group L3 and an aperture stop portion PP, and equipped with a motor for driving the second lens group L2, and a motor for driving the third lens group L3. With driving the motor, the second lens group L2 is moved along the optical axis (Z-axis direction) to focus the interchangeable lens portion 113. Moreover, with driving the motor, the third lens group L3 is moved in a direction perpendicular to the optical axis (XY-axis direction) to correct a hand-shake. The aperture stop portion PP is disposed between the second lens group L2 and the third lens group L3 to adjust light amount passing through the interchangeable lens portion 113.

The controller portion 114 carries out adjustment of the aperture stop portion PP of the interchangeable lens in accordance with the intended purpose. Although the controller portion 114 adjusts the aperture stop portion PP in accordance with an incident light amount from the interchangeable lens portion 113 and ambient brightness of the object to be observed, the controller portion 114 varies not only the incident light amount but also a depth of field (DOF).

In FIG. 16, external light LR incident on the interchangeable lens portion 113 passes through the first lens group L1, the second lens group L2, the aperture stop portion PP, and the third lens group L3 in this order, and is incident on the body portion 112. In the body portion 112, there are provided an introduction optical system (deflection optical system) 140 composed of a first mirror 141, a second mirror 142, a third mirror 143 and a fourth mirror 144. External light LR reflected a plurality of times in the introduction optical system 140 is led to a light flux division optical system 150. The light flux division optical system 150 is composed of a semi-transparent mirror 153, a fifth mirror 154, a sixth mirror 155, and a seventh mirror 156. External light LR divided by the light flux division optical system 150 into two is incident on respective left and right eyepiece tubes of the binocular portion 111, and passes through a pair of eyepiece lenses 159. As described above, the telescope 110 makes it possible to carry out binocular observation with using a single interchangeable lens portion 113.

FIG. 17 shows an arrangement of mirrors in the body portion 112 according to a tenth embodiment.

External light LR from the interchangeable portion 113 incident on the body portion 112 reaches a pair of eyepiece lenses 159 of the light flux division optical system 150 through the introduction optical system 140.

An image of an unillustrated object to be observed is formed as a primary image IM-A (reversed image) by the interchangeable lens portion 113. A field lens 148 is disposed in the vicinity of the primary image IM-A. The field lens 148 and a relay lens 149 converge the primary image IM-A again to form a secondary image IM-B (erected image). Since the introduction optical system 140 has a function to reverse an image, a reversed image of the object to be observed is finally observed by the observer through the eyepiece lenses 159. The field lens 148 has a function to define a field diameter of the telescope 110 (FIG. 16), and forms an exit pupil of the interchangeable lens portion 113 in the vicinity of the relay lens 149 in order to effectively use light flux of the interchangeable lens portion 113. The relay lens 149 has a function to expand the optical path.

The light flux division optical system 150 is an optical system called as a Seidentopf type, and divides the optical axis OA by the semi-transparent mirror 153 or a prism. Since the reversed image (primary image IM-A) formed by the interchangeable lens portion 113 is erected (secondary image IM-B) by the field lens 148 and the relay lens 149, inversion of image is not carried out by the light flux division optical system 150.

The distance from the primary image IM-A to the secondary image IM-B is determined by the magnification β and the focal length of the relay lens 149. In order to shorten the total length in Z-axis direction of the telescope 110, the distance in Z-axis direction from the primary image IM-A to the secondary image IM-B is necessary to be shortened. In the present embodiment, the total length in Z-axis direction of the telescope 110 (FIG. 16) is shortened by bending the optical path in the introduction optical system 140 with keeping erected image between the interchangeable lens portion 113 and the light flux division optical system 150. With reference to FIGS. 18A, 18B, 18C and 18D, it is explained that the total length in Z-axis direction of the telescope 110 is shortened.

Figure 18A:
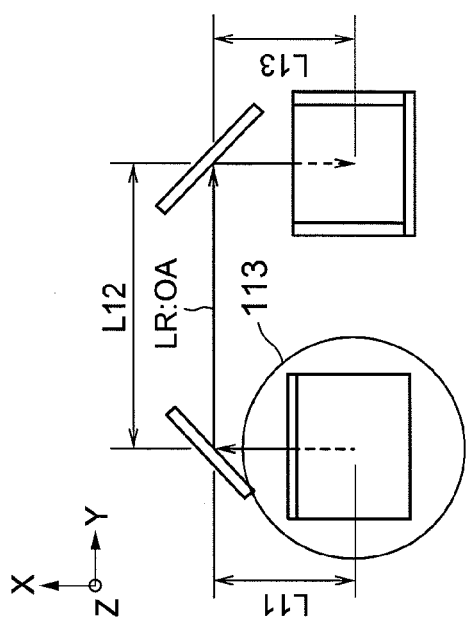
Figure 18B:
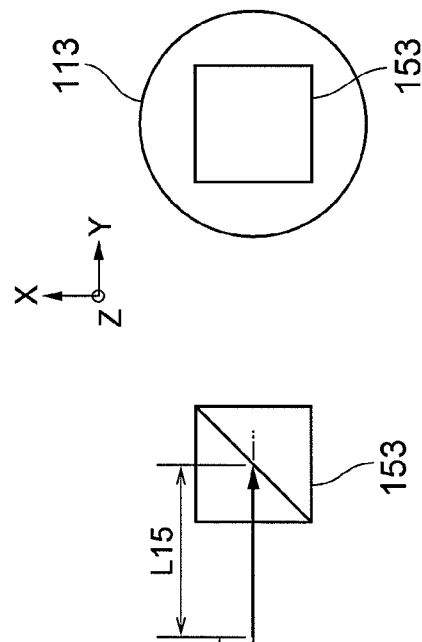

FIGS. 18A and 18B are drawings showing an optical path from the interchangeable lens portion 113 to the semi-transparent mirror 153 of the light flux division optical system 150 in the light introduction optical system 140 according to the tenth embodiment. FIG. 18A is a plan view of an XZ plane, and FIG. 18B is a plan view of an XY plane.

Figure 18C:
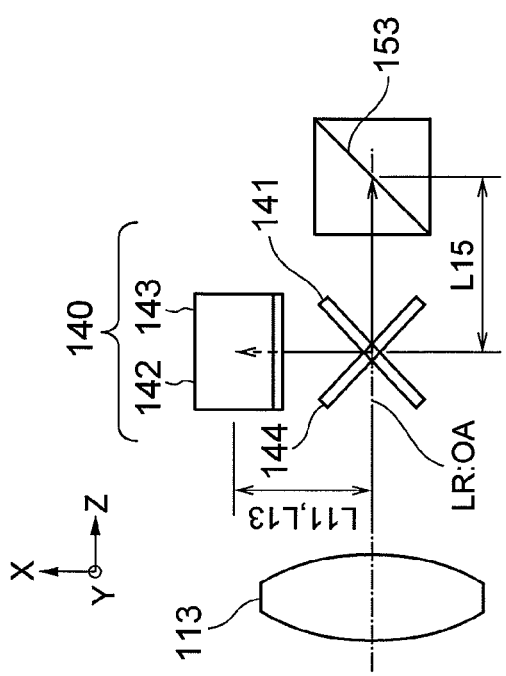
Figure 18D:
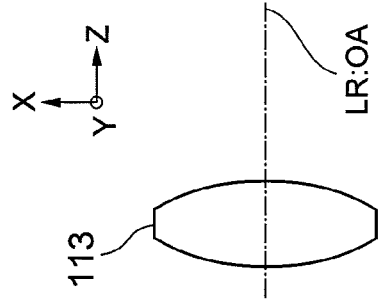

FIGS. 18C and 18D are reference views showing an optical path from the interchangeable lens portion 113 to the semi-transparent mirror 153 of the light flux division optical system 150 in a case where the light introduction optical system 140 is not exist, in which FIG. 18C is a plan view of an XZ plane, and FIG. 18D is a plan view of an XY plane.

As shown in FIGS. 17, 18A and 18B, external light LR passed through the interchangeable lens portion 113 from Z-axis direction is reflected by the first mirror 141, which is a total reflection mirror, with changing in X-axis direction, and reflected by the second mirror 142 with changing in Y-axis direction. Moreover, external light LR is reflected by the third mirror 143 with changing in X-axis direction, and reflected by the fourth mirror 144 with changing in Z-axis direction. External light LR reflected by the fourth mirror 144 is led to the light flux division optical system 150. Although not shown in FIG. 18A or 18B, the field lens 148 is disposed between the first mirror 141 and the second mirror 142, and the relay lens 149 is disposed between the third mirror 143 and the fourth mirror 144.

As shown in FIGS. 18A and 18B, the optical path length between the first mirror 141 and the second mirror 142 is to be L11, and the optical path length between the second mirror 142 and the third mirror 143 is to be L12, and the optical path length between the third mirror 143 and the fourth mirror 144 is to be L13. Moreover, the optical path length between the fourth mirror 144 and the semi-transparent mirror 153 is to be L15. As is understood by comparing FIG. 18A with FIG. 18C, the total length in Z-axis direction in which the optical path length L11, the optical path length L12 and the optical path length L13 are added is shorter in the tenth embodiment.

As shown in FIG. 17, since the distance W1 between the left and right eyepiece lenses 159 of the binocular portion 111 is necessary to substantially coincide with the interpupillary distance of the observer, the telescope 110 is necessary to have a given length in X-axis direction. When the optical path length L11 and the optical path length L13 are secured within the range of the distance W1, the dimension in X-axis direction of the telescope 110 shown in FIG. 15 does not become so long. On the other hand, when the total length in Z-axis direction in which the optical path length L11, the optical path length L12 and the optical path length L13 are added can be shortened, operability of the telescope 110 increases. However, when the optical path length L12 is made large, a distance between the optical axis of the interchangeable lens portion 113 and the optical axis of the light flux division optical system 150 becomes too large to spoil operability, so that it is preferable to adjust the optical path length L11 and the optical path length L13 so as to shorten the total length. In the tenth embodiment, although total reflection mirrors are used from the first mirror 141 to the fourth mirror 144, it is needless to say that total reflection prisms may be used instead.

Eleventh Embodiment

Figure 19:
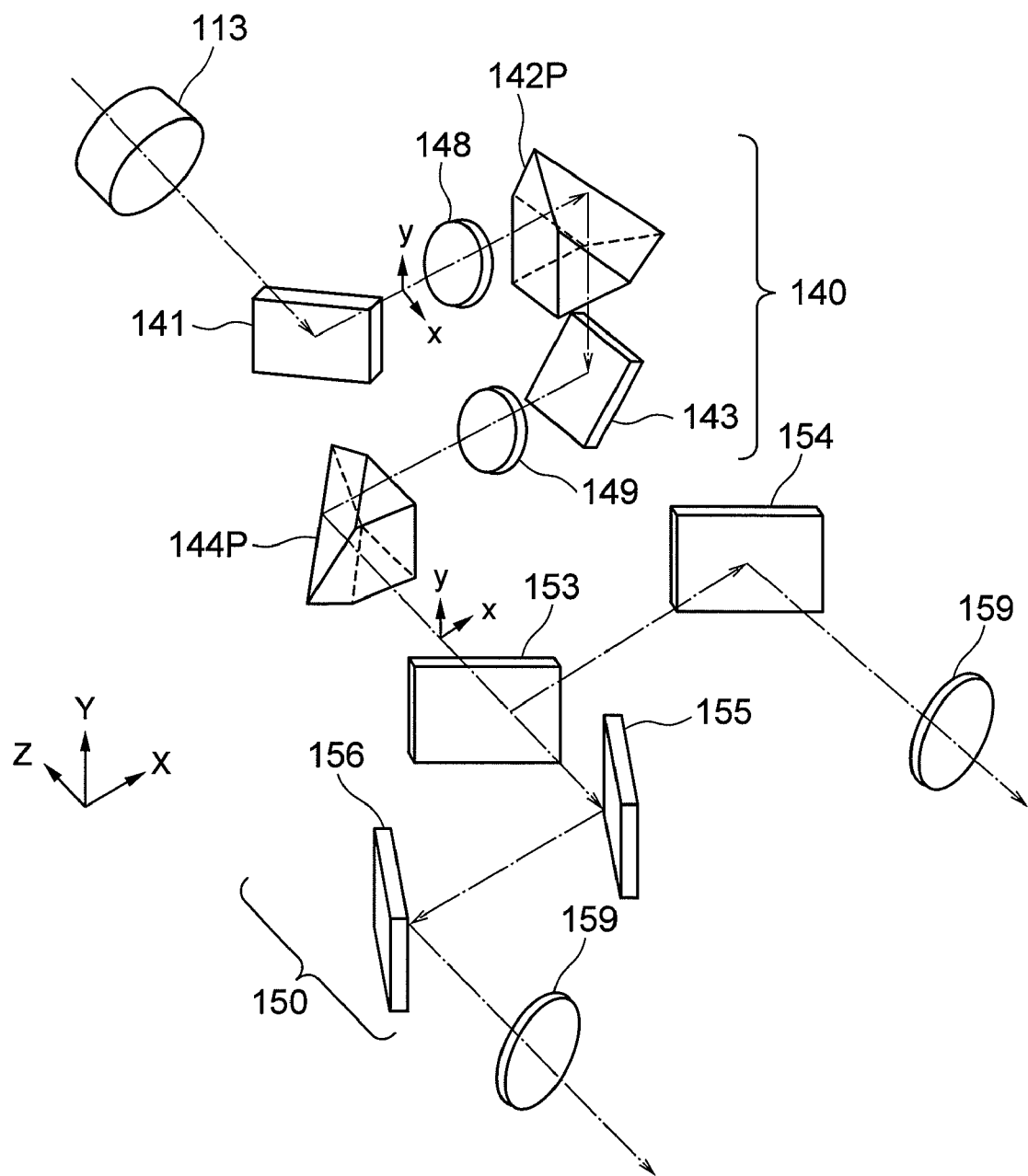
FIG. 19 is a perspective view showing an arrangement of right angle roof prisms and mirrors in a body portion according to an eleventh embodiment of the present invention.

FIG. 19 shows an arrangement of right angle roof prisms and mirrors in a body portion 112 according to an eleventh embodiment.

As shown in FIG. 19, external light LR passed through an interchangeable lens portion 113 from Z-axis direction is reflected by a first mirror 141, which is a total reflection mirror, with changing direction in X-axis direction, and incident on a field lens 148. External light LR passed through the field lens 148 is reflected by a second rectangular roof prism 142P with changing direction in Y-axis direction. Moreover, external light LR is reflected by a third mirror 143 with changing direction in X-axis direction, and incident on a relay lens 149. External light LR passed through the relay lens 149 is reflected by a fourth rectangular roof prism 144P with changing direction in Z-axis direction. External light LR reflected by the fourth rectangular roof prism 144P is led to a light flux division optical system 150.

Unlike the tenth embodiment, the direction of the image is reversed in left-right direction by the second rectangular roof prism 142P, and in up-down direction by the fourth rectangular roof prism 144P. Accordingly, an observer can observe an erected image through the eyepiece lens 159.

Twelfth Embodiment

FIG. 20 shows an arrangement of mirrors in a body portion 112 according to a twelfth embodiment. FIGS. 21A and 21B show an optical path of a light introduction optical system (deflection optical system) 140 according to the twelfth embodiment from an interchangeable lens portion 113 to a semi-transparent mirror 153 of a light flux division optical system 150, in which FIG. 21A is a plan view of an XZ plane, and FIG. 21B is a plan view of an XY plane.

As shown in FIGS. 20, 21A and 21B, external light LR passed through the interchangeable lens portion 113 from Z-axis direction is reflected by a first mirror 141, which is a total reflection mirror, with changing direction in X-axis direction, and reflected by a second mirror 142E with changing direction in Z-axis direction. Moreover, external light LR is reflected by a third mirror 143E with changing direction in X-axis direction, and reflected by a fourth mirror 144 with changing direction in Z-axis direction. External light LR reflected by the fourth mirror 144 is led to the light flux division optical system 150. Incidentally, although not shown in FIG. 21A or 21B, a field lens 148 is disposed between the first mirror 141 and the second mirror 142E, and a relay lens 149 is disposed between the third mirror 143E and the fourth mirror 144.

As shown in FIGS. 21A and 21B, an optical path length between the first mirror 141 and the second mirror 142E is to be L11, an optical path length between the second mirror 142E and the third mirror 143E is to be L12, and an optical path length between the third mirror 143E and the fourth mirror 144 is to be L13. Moreover, an optical path length between the fourth mirror 144 and a semi-transparent mirror 153 is to be L15. When FIG. 21A of the twelfth embodiment is compared with FIG. 18A of the tenth embodiment, the length in Z-axis direction in FIG. 21A is longer by an amount of the optical path length L12. On the other hand, when FIG. 21B of the twelfth embodiment is compared with FIG. 18B of the tenth embodiment, it is understood that the optical axis of the interchangeable lens portion 113 coincides with the optical axis incident on the semi-transparent mirror 153.

As shown in FIG. 20, the distance W1 between the left and right eyepiece lenses 159 of a binocular portion 111 has to substantially coincide with an interpupillary distance of an observer, so that the telescope 110 has a given length in X-axis direction. When the optical path lengths L11 and L13 are secured within a range of the distance W1, the dimension in X-axis direction of the telescope 110 shown in FIG. 15 does not become long. On the other hand, when the length in Z-axis direction in which the optical path lengths L11 and L13 are added can be shortened, operability of the telescope 110 increases. Moreover, since the optical axis of the interchangeable lens portion 113 coincides with the optical axis of the light flux division optical system 150, operability is excellent.

In tenth through twelfth embodiments, although a case where the relay lens is one is explained, the relay lens may be two or more. When an imaging function is to be added to the telescope 110, the first mirror 141 is made to be a quick-return mirror and an imaging device such as a CCD may be disposed behind it. Moreover, the first mirror 141 is made to be a semi-transparent mirror and an AF function for receiving light for auto focus may be disposed behind it. The AF function can obtain a signal for carrying out auto focus of the interchangeable lens portion 113.

A zoom mechanism or a vibration reduction mechanism can be installed in the objective optical system of the telescope according to each embodiment described above. For example, a pair of binoculars is equipped with a pair of binocular optical systems, each composed of an objective optical system, an erecting prism and an eyepiece optical system, with separating them by an amount of interpupillary distance. Accordingly, when each objective optical system of a pair of binoculars is made to be a zoom lens, and when a minute moving error is generated between the zoom lenses upon zooming, the error is magnified by the eyepiece optical system, so that an observation image may be deteriorated. Accordingly, extremely high driving accuracy and adjustment are required by a zoom mechanism of each zoom lens resulting in heavy weight and high cost. This is the same as a case where an optical element of each objective optical system of a pair of binoculars is made to be a vibration reduction lens. On the other hand, since the telescope according to each embodiment has a single objective optical system described above, the above described driving accuracy or adjustment is not required upon installing a zoom mechanism or a vibration reduction mechanism, so that it has an advantage that heavy weight and high cost are not brought upon. Incidentally, the telescope according to the above described each embodiment can be equipped with, for example, a zoom lens or a vibration reduction optical system for a camera as an objective optical system.

What is claimed is:
1. A telescope comprising:
a single objective optical system; and
a binocular body member;
the binocular body member including a mount portion for connecting to the objective optical system, and a controller for controlling the objective optical system;
wherein the binocular body member includes a binocular optical system, and
the telescope further comprises:
an introduction optical system that includes a first reflection surface that reflects light from the objective optical system to a second direction perpendicular to a first direction, which is an optical axis direction of the objective optical system, a second reflection surface that reflects light reflected by the first reflection surface to a third direction, which is perpendicular to the first direction and the second direction, a third reflection surface that reflects light reflected by the second reflection surface to the second direction, and a fourth reflection surface that reflects light reflected by the third reflection surface to the first direction, and a light flux division optical system that divides light from the introduction optical system to lead to the binocular optical system.

2. The telescope according to claim 1, wherein one of the first reflection surface and the fourth reflection surface and one of the second reflection surface and the third reflection surface are each a reflection surface of a rectangular roof prism or a rectangular roof mirror.

3. A telescope comprising:
a single objective optical system; and
a binocular body member;
the binocular body member including a mount portion for connecting to the objective optical system, and a controller for controlling the objective optical system;
wherein the binocular body member includes a binocular optical system, and
the telescope further comprises:
an introduction optical system that includes a first reflection surface that reflects light from the objective optical system to a second direction perpendicular to a first direction, which is an optical axis direction of the objective optical system, a second reflection surface that reflects light reflected by the first reflection surface in the first direction, a third reflection surface that reflects light reflected by the second reflection surface to the second direction, and a fourth reflection surface that reflects light reflected by the third reflection surface to the first direction, and
a light flux division optical system that divides light from the introduction optical system to lead to the binocular optical system, and
wherein the optical axis of the objective optical system coincides with an optical axis of the reflection light from the fourth reflection surface.

4. The telescope according to claim 3, wherein a relay lens is disposed between the third reflection surface and the fourth reflection surface.

5. The telescope according to claim 4, wherein the following conditional expression is satisfied:

$$\beta \leq (2/3) \cdot (fe/fo) \cdot \phi o$$

where $\beta$ denotes magnification of the relay lens, $fe$ denotes a focal length of the eyepiece optical system, $fo$ denotes a focal length of the objective optical system, and $\phi o$ denotes an effective diameter of the objective optical system.

6. The telescope according to claim 3, wherein a field lens is disposed between the first reflection surface and the second reflection surface.

* * * * *